United States Patent [19]

Yonemitsu et al.

[11] Patent Number: 5,485,279
[45] Date of Patent: Jan. 16, 1996

[54] METHODS AND SYSTEMS FOR ENCODING AND DECODING PICTURE SIGNALS AND RELATED PICTURE-SIGNAL RECORDS

[75] Inventors: Jun Yonemitsu; Katsumi Tahara, both of Kanagawa; Teruhiko Suzuki, Chiba, all of Japan

[73] Assignee: Sony Corporation, Tokyo, Japan

[21] Appl. No.: 87,207

[22] Filed: Jul. 2, 1993

[30]  Foreign Application Priority Data

| Jul. 3, 1992 | [JP] | Japan | 4-177217 |
| Oct. 23, 1992 | [JP] | Japan | 4-286186 |
| Nov. 2, 1992 | [JP] | Japan | 4-294654 |
| May 28, 1993 | [JP] | Japan | 5-126778 |

[51] Int. Cl.$^6$ ............................ H04N 7/32; H04N 5/92
[52] U.S. Cl. .................. 348/411; 358/335; 358/319; 348/407; 348/409
[58] Field of Search ........................ 358/335, 310, 358/319, 342; 360/33.1, 32; 348/407, 408, 409, 410, 411, 394, 412, 415, 426; H04N 5/92, 7/32

[56]  References Cited

U.S. PATENT DOCUMENTS

| 4,849,812 | 7/1989 | Borgers et al. | 348/407 |
| 5,001,561 | 3/1991 | Haskell et al. | 358/133 |
| 5,136,376 | 8/1992 | Yagasaki et al. | 348/409 |
| 5,155,593 | 10/1992 | Yonemitsu et al. | 348/411 |
| 5,173,773 | 12/1992 | Ueda et al. | 348/407 |
| 5,202,760 | 4/1993 | Tourtier et al. | 358/310 |
| 5,212,549 | 5/1993 | Ng et al. | 348/409 |
| 5,253,056 | 10/1993 | Puri et al. | 348/409 |

FOREIGN PATENT DOCUMENTS

| 15205/88 | 11/1988 | Australia. | |
| 0321318 | 6/1989 | European Pat. Off. . | |
| 0485230 | 5/1992 | European Pat. Off. . | |

OTHER PUBLICATIONS

Signal Processing, Image Communication, vol. 4, No. 3, Jun. 1992, Amsterdam NL pp. 245–262, XP000270232 Vandendorpe 'Hierarchical transform and subband coding of video signals'.

Signal Processing of HDTV, III, Sep. 1991, Turin, It pp. 523–530, XP000379990 Chiang et al. 'Compatible Coding of Digital Interlaced HDTV Using Prediction of the Even Fields from the Odd Fields' *abstract, *p. 525, par. 3, p. 526, par. 2, *p. 527 par. 2–p. 528, Line 1 *FIGS. 2–4.

Signal Processing of HDTV, III, Sep. 1991, Turin, It pp. 353–360, XP000379972 Dufour et al. 'A HDTV compatible coding scheme for distribution purposes' *abstract, *p. 354, last par.–p. 356, par. 1, *p. 359, line 1—p. 360, par. 1, *FIGS. 2, 4.

IEEE Signal Processing Magazine, vol. 8, No. 4, Oct. 1991, New York US pp. 14–38, XP000259548 Rioul et al. 'Wavelets and Signal Processing' *FIGS. 2, 11.

*Primary Examiner*—Howard W. Britton
*Assistant Examiner*—Huy Nguyen
*Attorney, Agent, or Firm*—William S. Frommer; Alvin Sinderbrand

[57]  ABSTRACT

Reproducing an input image of reduced resolution with respect to the vertical and horizontal directions in high picture quality by processing a coded bit stream of normal resolution. A difference signal (mismatching error signal) representing the difference between a predicted image of the normal resolution and a predicted image of a half resolution with respect to the vertical and horizontal directions is coded and the coded difference signal is transmitted. When producing the predicted image, image data is subjected to motion compensation according to a specified prediction mode.

20 Claims, 32 Drawing Sheets

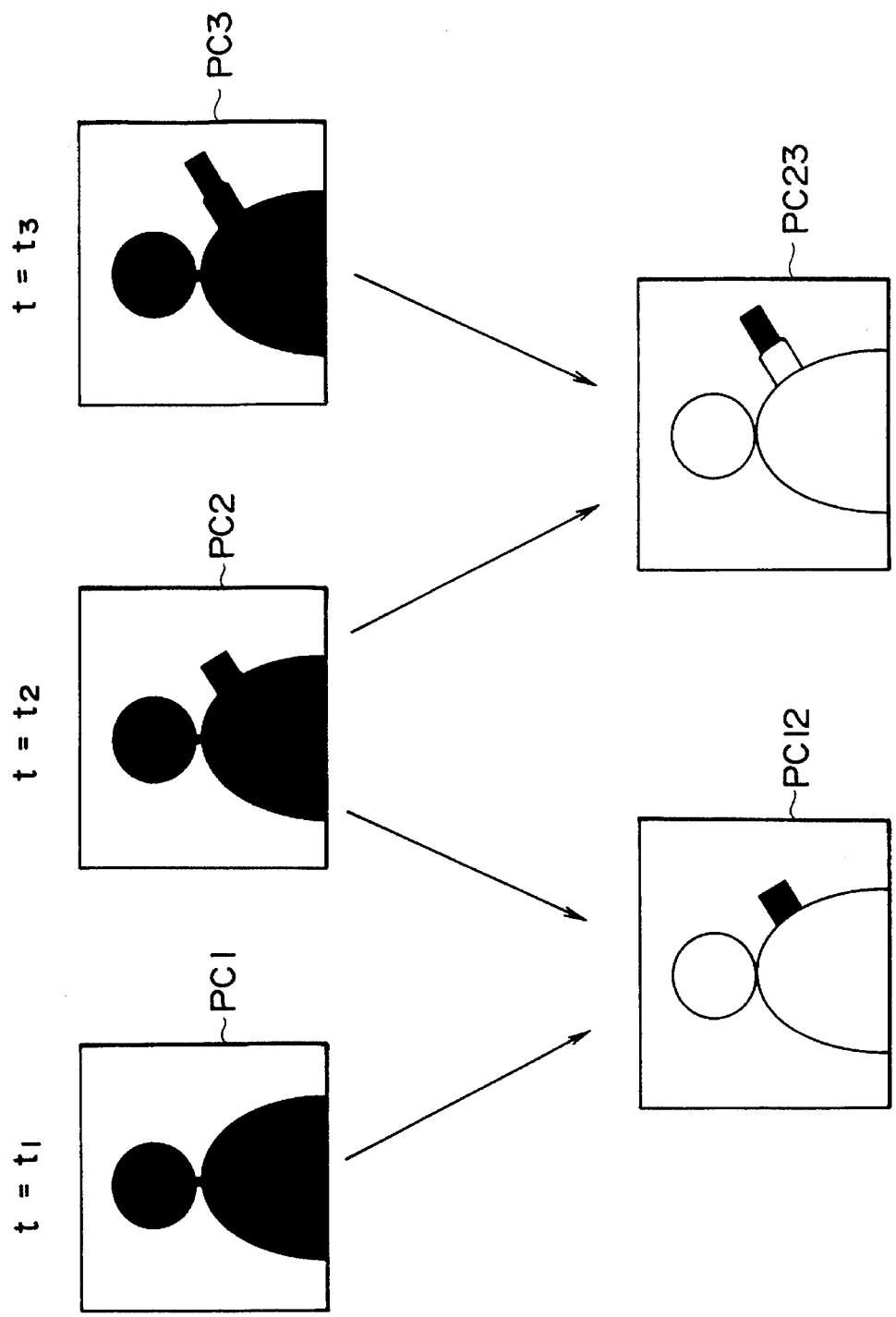

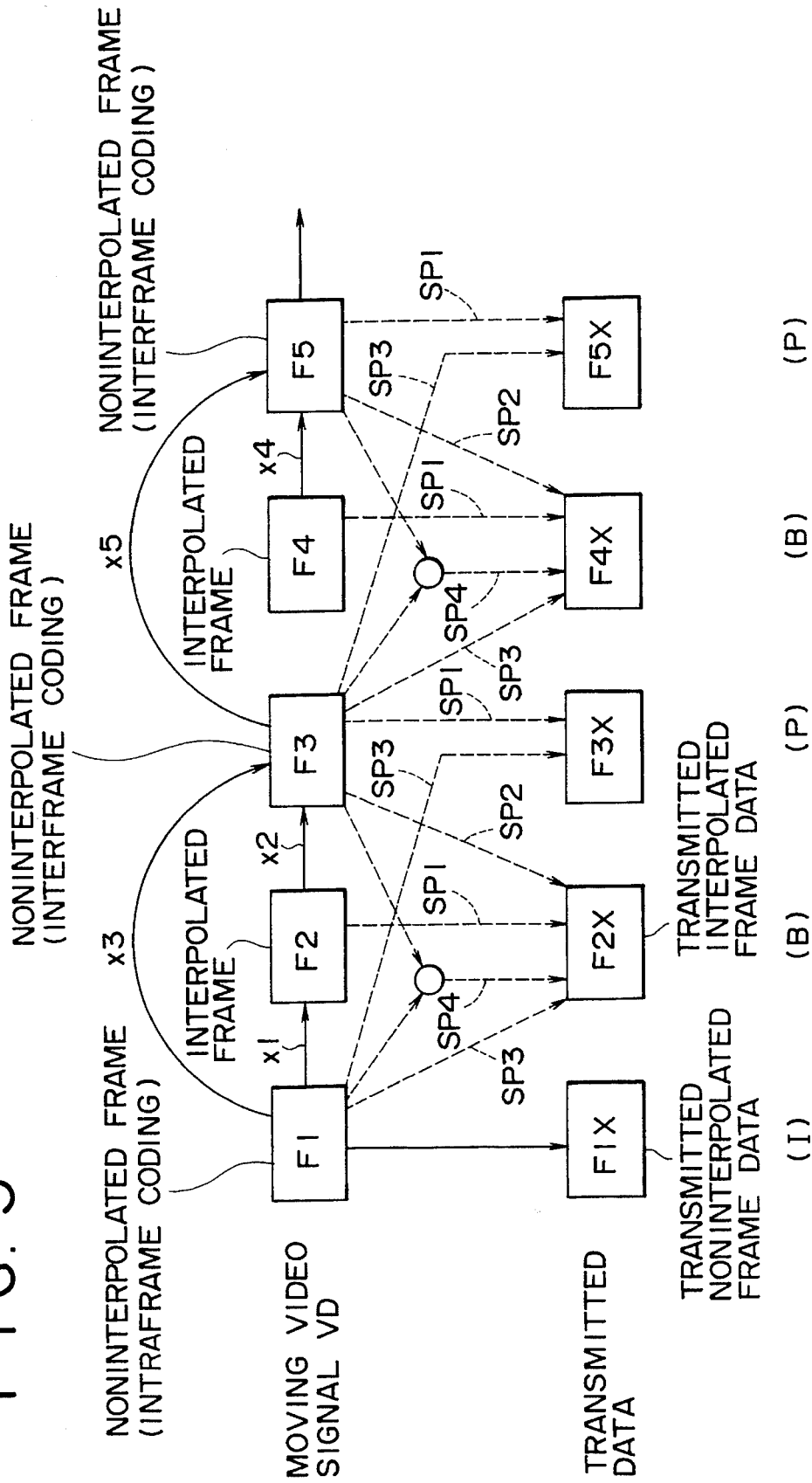

FIG. 7

| d(0,0) | d(0,1) | d(0,2) | d(0,3) | d(0,4) | d(0,5) | d(0,6) | d(0,7) |
|---|---|---|---|---|---|---|---|
| d(1,0) | d(1,1) | d(1,2) | d(1,3) | d(1,4) | d(1,5) | d(1,6) | d(1,7) |
| d(2,0) | d(2,1) | d(2,2) | d(2,3) | d(2,4) | d(2,5) | d(2,6) | d(2,7) |
| d(3,0) | d(3,1) | d(3,2) | d(3,3) | d(3,4) | d(3,5) | d(3,6) | d(3,7) |
| d(4,0) | d(4,1) | d(4,2) | d(4,3) | d(4,4) | d(4,5) | d(4,6) | d(4,7) |
| d(5,0) | d(5,1) | d(5,2) | d(5,3) | d(5,4) | d(5,5) | d(5,6) | d(5,7) |
| d(6,0) | d(6,1) | d(6,2) | d(6,3) | d(6,4) | d(6,5) | d(6,6) | d(6,7) |
| d(7,0) | d(7,1) | d(7,2) | d(7,3) | d(7,4) | d(7,5) | d(7,6) | d(7,7) |

FIG. 8

| d(0,0) | d(0,1) | d(0,2) | d(0,3) |
|---|---|---|---|
| d(1,0) | d(1,1) | d(1,2) | d(1,3) |
| d(2,0) | d(2,1) | d(2,2) | d(2,3) |
| d(3,0) | d(3,1) | d(3,2) | d(3,0) |

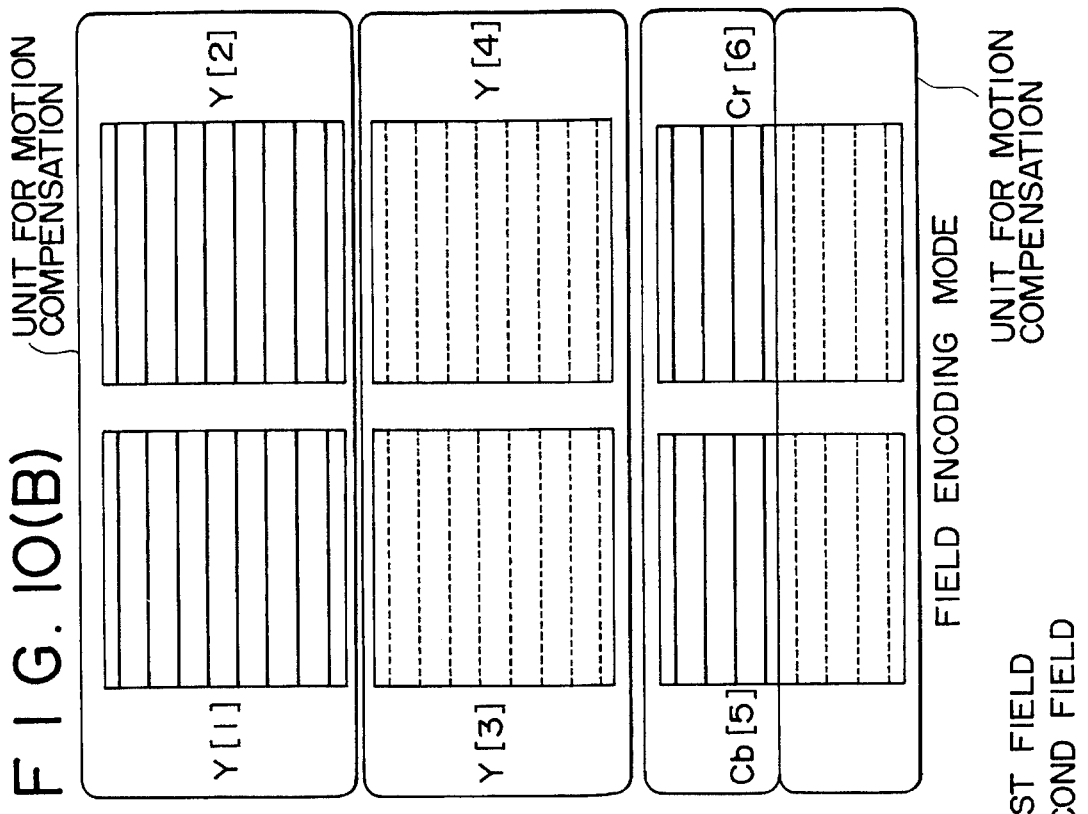
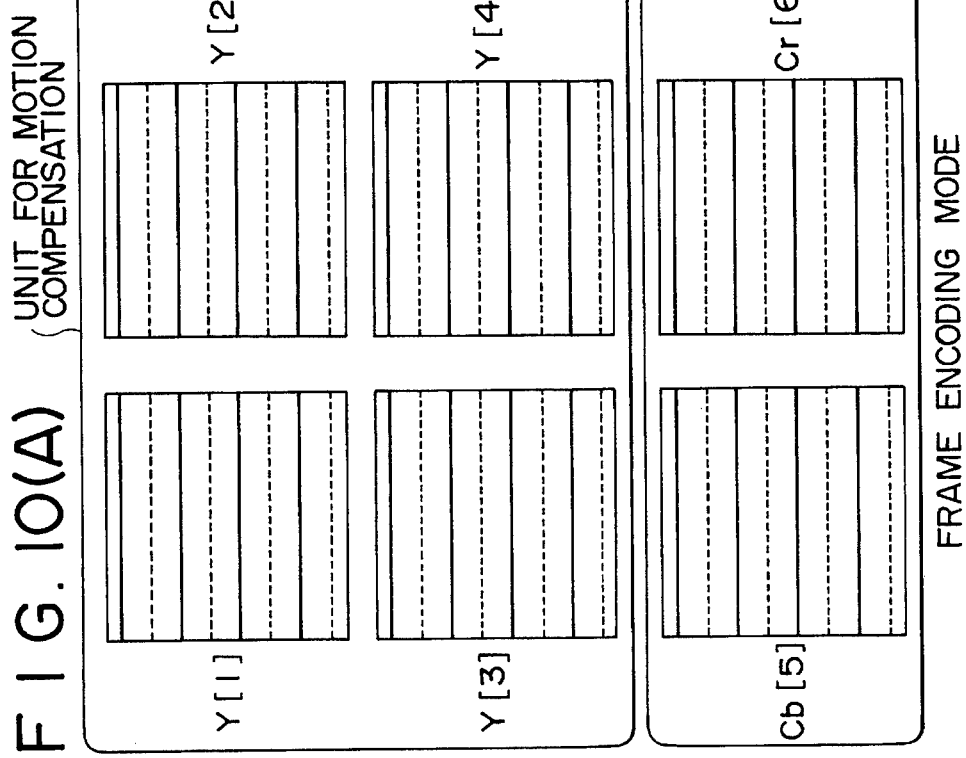
F I G. 10(A) FRAME ENCODING MODE
F I G. 10(B) FIELD ENCODING MODE
—— DATA OF THE FIRST FIELD
---- DATA OF THE SECOND FIELD

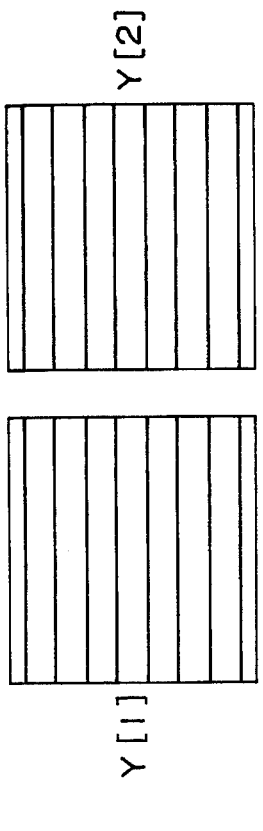
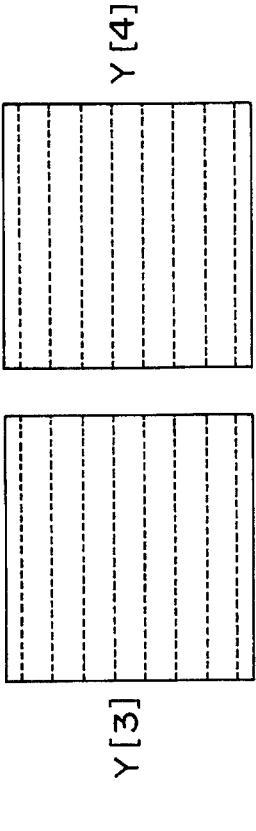
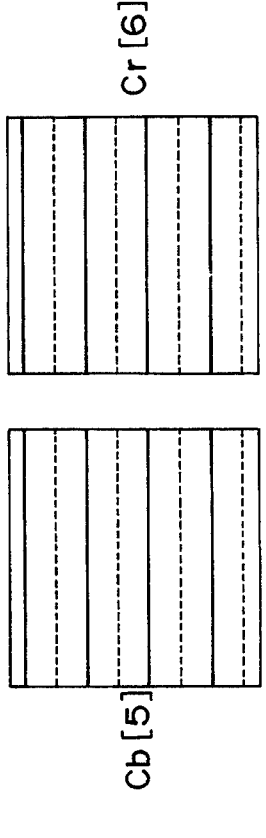
FIG. 11(A) FRAME DCT MODE
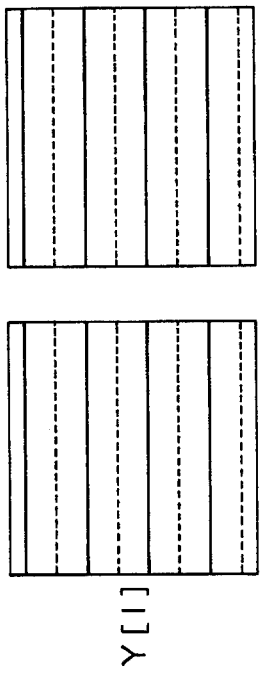
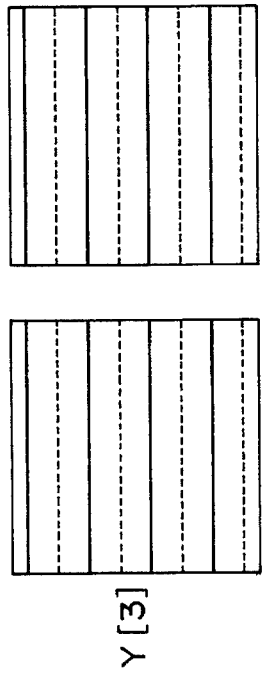
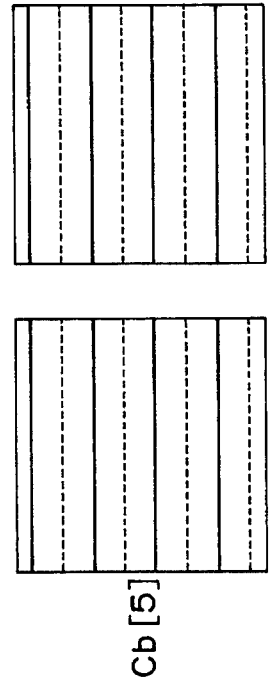
FIG. 11(B) FIELD DCT MODE
—— DATA OF THE FIRST FIELD
----- DATA OF THE SECOND FIELD

FIG. 12

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

ZIGZAG SCANNING

- ● REFERENCE PIXEL
- ○ INTERPOLATED PIXEL
- □ 1/4 RESOLUTION PREDICTED PIXEL $p = (3A + D)/4$ $q = (3D + B)/4$ $r = (3D + A)/4$ $s = (A + C)/2$

- ● REFERENCE PIXEL
- ○ INTERPOLATED PIXEL
- ☐ 1/4 RESOLUTION PREDICTED PIXEL $$q = (3D+B)/4$$
$$s = (A+C)/2$$
$$p = (A+q)/2 = (4A+B+3D)/8$$
$$r = (q+s)/2 = (2A+B+2C+3D)/4$$

- ● REFERENCE PIXEL
- ○ INTERPOLATED PIXEL
- □ 1/4 RESOLUTION PREDICTED PIXEL $p = (3A+B)/4$ $q = (A+B)/2$ $r = (3B+A)/4$

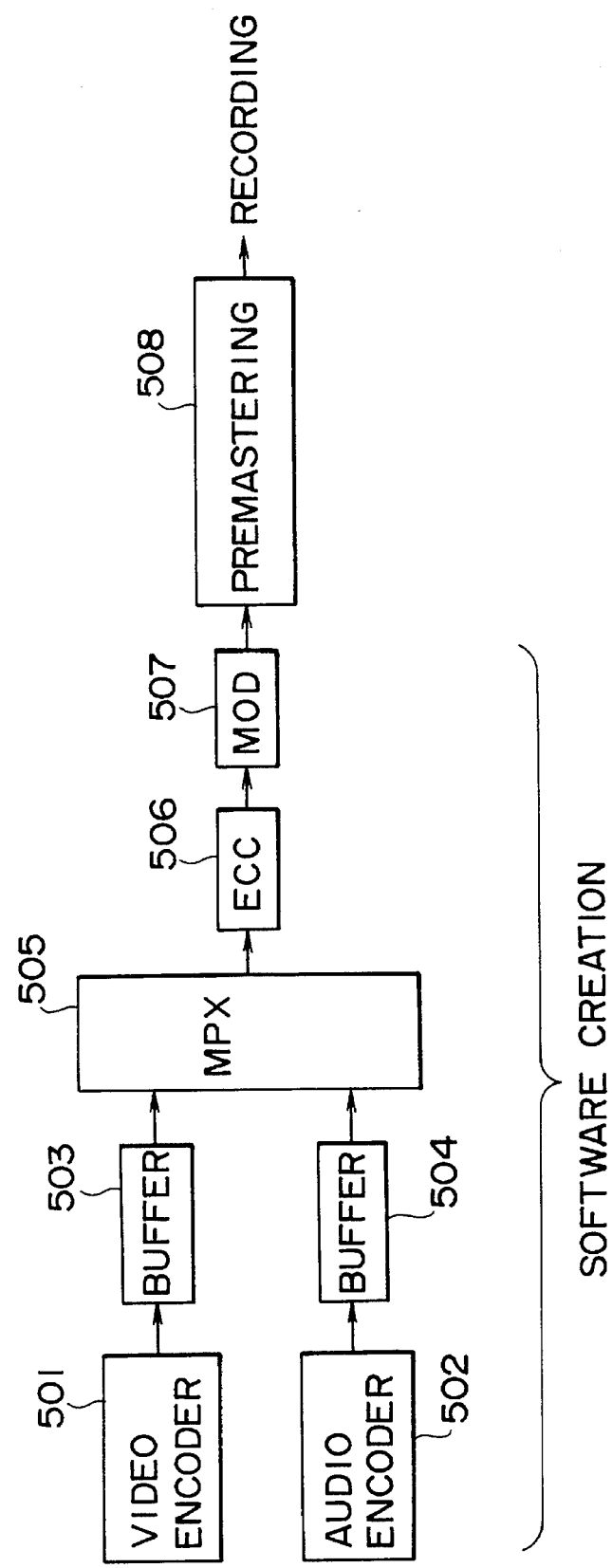

METHODS AND SYSTEMS FOR ENCODING AND DECODING PICTURE SIGNALS AND RELATED PICTURE-SIGNAL RECORDS

BACKGROUND OF THE INVENTION

The present invention relates to methods and systems for encoding and decoding picture signals and related picture signal recording media. For example, the present invention relates to such methods and systems suitable for use in compressing high definition television signals (HDTV signals) and recording the compressed HDTV signals in a recording medium, such as an optical disk, magnetooptic disk or a magnetic tape, reproducing the recorded compressed HDTV signals, expanding the reproduced compressed HDTV signals to restore the normal range and displaying the restored HDTV signals.

FIG. 1 shows a conventional image signal encoder and a conventional image signal decoder by way of example. The image signal encoder includes a preprocessing circuit 1 which separates a luminance signal (Y signal) and a color difference signal (C signal) of an input image signal VD, such as an HDTV signal. An AD converter 2 converts the luminance signal into a corresponding digital luminance signal and stores the digital luminance signal temporarily in a frame memory 4. An AD converter 3 converts the color difference signal into a corresponding digital color difference signal and stores the digital color difference signal temporarily in a frame memory 5. A format conversion circuit 6 converts the digital luminance signal and the digital color difference signal in frame format stored in the frame memories 4 and 5 into corresponding luminance data and color difference data in a block format, and provides the luminance data and the color difference data in block format to an encoder 7. The encoder 7 encodes the input signals and supplies a bit stream representing the coded input signals to a recording medium 8, such as an optical disk, a magnetooptic disk or a magnetic tape for recording.

A decoder 9 decodes the data reproduced from the recording medium 8 in a bit stream. A format conversion circuit 10 converts the decoded data in block format provided by the decoder 9 into corresponding decoded data in frame format. Luminance data and color difference data provided by the format conversion circuit 10 are stored respectively in frame memories 11 and 12. The luminance data and the color difference data read from the frame memories 11 and 12 are converted into an analog luminance signal and an analog color difference signal, respectively, by D/A converters 13 and 14. A post processing circuit 15 combines the analog luminance signal and the analog color difference signal to provide an output image signal to an external circuit, not shown for purposes of simplicity and clarity.

As shown in FIG. 2, image data representing a picture of one frame is depicted therein consisting of V lines each of H dots per inch which is sliced into N slices, i.e., a slice 1 to a slice N, each of, for example, sixteen lines, and each slice includes M macroblocks. Each macroblock comprises data blocks Y[1] to Y[4] including the luminance data of a group of 8×8 pixels, and data blocks Cb[5] to Cr[6] including color difference data corresponding to all the pixel data (16×16 pixels) of the data blocks Y[1] to Y[4].

Thus, each macroblock includes the image data Y[1] to Y[4] of the 16×16 pixel area arranged along the horizontal and vertical scanning directions as a unit for the luminance signal. The two color difference signals are time-base multiplexed after data compression and the color difference data for the 16×16 pixel area is allocated to the blocks Cr[6] and Cb[4] each having 8×8 pixels to process one unit. The image data represented by the macroblocks are arranged successively in the slice, and the image data represented by the blocks (8×8 pixels) are arranged successively in a raster scanning sequence in the macroblock (16×16 pixels).

The image data Y[1] to Y[4] and the color difference data Cb[5] and Cr[5] are transmitted in that order. The numerals in the reference characters denoting the data indicate the data's turn for transmission.

The encoder 7 compresses the received image data and supplies the compressed image data to the recording medium 8. The decoder expands the compressed data received thereby and provides the expanded image data to the format conversion circuit 10. The quantity of the data to be recorded in the recording medium 8 can be reduced by compression based on the line correlation and/or interframe correlation properties of image signals. The line correlation property enables compression of the image signal by, for example, discrete cosine transformation (DCT).

Interframe correlation enables further compression of the image signal. For example, suppose that frame pictures PC1, PC2 and PC3 are produced respectively at times $t_1$, $t_2$ and $t_3$ as shown in FIG. 3. The differences between image signals respectively representing the frame pictures PC1 and PC2 are calculated to produce a frame picture PC12, and the differences between the frame pictures PC2 and PC3 are calculated to produce a frame picture PC23. Since the differences between successive frame pictures, in general, are not very large, a signal representing such differences is small. The difference signal is coded to further reduce the quantity of data.

As shown in FIGS. 4A and 4B, a group of pictures including image signals representing frames F1 to F17 is processed as a unit wherein each frame is encoded either as an "I picture", a "P picture" or a "B picture", as explained below. More specifically, the image signal representing the head frame F1 is coded as an I picture, the image signal representing the second frame F2 is coded as a B picture and the image signal representing the third frame F3 is coded as a P picture. The image signals representing the fourth frame F4 to the seventeenth frame F17 are coded alternately as B picture and P pictures.

The image signal representing the I picture is obtained by coding the image signal representing the corresponding frame (intraframe encoding). Basically, the image signal representing the P picture is encoded selectively by choosing one of two modes; either of which is selected to encode each macroblock depending on which mode provides greatest efficiency. The two modes available for encoding the macroblocks of each P picture include (1) intraframe encoding, and (2) an interframe encoding technique in which the differences between the image signal representing the corresponding frame and the image signal representing the preceding I picture or P picture are encoded as shown in FIG. 4(A). The image signal representing the B picture is obtained by selectively encoding each macroblock using the most efficient one of (1) intraframe encoding, (2) interframe encoding, and a bidirectional encoding technique in which the differences between the image signal representing the corresponding frame and the mean of the image signals representing the preceding and succeeding frames are encoded as indicated in FIG. 4B.

FIG. 5 is a diagrammatic view to assist in explaining the principles of a method for coding a moving picture. As shown in FIG. 5, the first frame F1 is processed as an I picture to provide data F1X on a transmission line (intraframe coding). The second frame F2 is processed as a B picture coded to provide transmission data F2X.

As indicated above, the macroblocks of the second frame F2 as a B picture can be processed in any of a plurality of processing modes. In the first (intraframe) processing mode, the data representing the frame F2 is coded to provide the transmission data F2X (SP1), which is the same as the processing mode for processing the I picture. In a second (interframe) processing mode, the differences (SP2) between the frame F2 and the succeeding frame F3 are calculated and coded for transmission in a backward predictive coding mode. In a third processing mode (also interframe), the difference (SP3) between the frame F2 and the preceding frame F1 are coded for transmission in a forward predictive coding mode. In a fourth (bidirectional-predictive) processing mode, the differences (SP4) between the frame F2 and the mean of the preceding frame F1 and the succeeding frame F3 are calculated and coded to transmit transmission data F2X. That one of the these processing modes providing the least amount of data is employed for each macroblock.

For each macroblock, a motion vector x1 representing the motion of the picture of the objective frame (F1) for the calculation of the difference data (a motion vector between the frames F1 and F2) (forward prediction) or a motion vector x2 (a motion vector between the frames F3 and F2 for backward prediction) or the motion vectors x1 and x2 are transmitted (bilateral prediction).

Difference data (SP3) representing the differences between the frame F3 of the P picture and the preceding frame F1 as a predicted picture, and a motion vector x3 are calculated, and the difference data and the motion vector x3 are transmitted as transmission data F3X (forward predictive coding mode) or the picture data (SP1) of the frame F3 is transmitted as the transmission data F3X (intraframe coding mode). Either the forward predictive coding mode or the interframe coding mode that will more effective for reducing the amount of data is employed.

Low-resolution image data can be obtained by compressing (thinning out or reducing) high-resolution image data, such as high definition television data, by half with respect to both the vertical and horizontal directions. The aspect ratio of the low-resolution image data can be changed from 16:9 to 4:3, and the low-resolution image can be reproduced with an NTSC type display.

When displaying a high-resolution picture after compressing the same to ¼ the original amount (½×½), the decoder 9 shown in FIG. 1 is configured, for example, as shown in FIG. 6. In this case, the image data is compressed by the encoder 7 in a discrete cosine transformation (DCT) mode.

Image data (DCT coefficients) obtained by DCT of the image data in units each of 8×8 pixel blocks is provided to the extraction circuit 21 of the decoder 9, and then the extraction circuit 21 extracts 8×8 data as shown in the chart of FIG. 7.

The 8×8 data d(i,j) represent DCT coefficients. In FIG. 7, the frequency of the picture components each corresponding with a given DCT coefficient as shown therein increase as the position of the given DCT coefficient is shifted toward the lower side of the chart, and the frequencies of the components likewise increase as the position of the DCT coefficient is shifted from left to right in the chart.

An extracting circuit 22 disposed after the extracting circuit 21 extracts the 4×4 DCT coefficients shown in FIG. 8 corresponding to the DC and lower-frequency AC components of the 8×8 DCT coefficients shown in FIG. 7. Thus, the 8×8 pixel data is thinned out by half in each of the horizontal and vertical directions to produce 4×4 coefficient data. The DCT coefficients shown in FIG. 8 are the 4×4 DCT coefficients in the upper left-hand portion of FIG. 7. The 4×4 DCT coefficients extracted by the extracting circuit 22 are supplied to an inverse discrete cosine transformation circuit (IDCT circuit) 23 for inverse discrete cosine transformation to obtain image data in 4×4 pixel groups having one-half resolution with respect to both the horizontal and vertical directions.

FIG. 9 is a block diagram showing a circuit configuration of the encoder 7 by way of example.

Macroblocks of image data to be coded, such as the image data of a high-resolution HDTV picture, are applied to a motion vector detecting circuit 50. The motion vector detecting circuit 50 processes the image data of each frame as an I picture, a P picture or a B picture according to a specified sequence. The mode of selection of an I picture, P picture or a B picture in processing the image data of the frames sequentially applied to the motion vector detecting circuit 50 is determined beforehand. For example, in one sequence the group of frames F1 to F17 are processed as I pictures, P pictures and B pictures, respectively, as shown in FIGS. 4A and 4B.

The image data of the frame to be processed as an I picture, for example, the frame F1, is transferred to and stored in a forward original image area 51a of a frame memory 51, the image data of a frame to be processed as a B picture, for example, the frame F2, is transferred to and stored in reference original image area 51b of the frame memory 51, and the image data of a frame to be processed as a P picture, for example, the frame F3, is transferred to and stored in a backward original image area 51c of the frame memory 51.

When the image of a frame to be processed as a B picture (frame F4) or P picture (frame F5) is provided in each cycle to the motion vector detecting circuit 50, the image data of the first P picture (frame F3) stored in the backward original image area 51c is transferred to the forward original image area 51a, the image data of the next B picture (frame F4) is stored (overwritten) in the reference original image area 51b, the image data of the next P picture (frame F5) is stored (overwritten) in the backward original image area 51c. These operations are repeated sequentially.

The image data of the pictures stored in the frame memory 51 are read therefrom, and then a frame/field mode switching circuit 52 processes the image data in a frame encoding mode or a field encoding mode. An arithmetic unit (prediction circuit) 53 operates under control of an encoding mode selecting circuit 54 for intraimage prediction, forward prediction, backward prediction or bilateral prediction. The selection of a predictive coding mode is dependent on a prediction error signal representing the difference between the objective reference original image and the corresponding predicted image. Accordingly, the motion vector detecting circuit 50 produces the sum of absolute values or the sum of squares of prediction error signals for use in the selection of the prediction mode.

The operation of the frame/field mode switching circuit 52 for selecting either the frame encoding mode or the field encoding mode will be described hereinafter.

When the frame encoding mode is selected, the circuit 52 transfers the four luminance blocks Y[1] to Y[4] given thereto from the motion vector detecting circuit 50 as they are to the arithmetic unit 53. In this case, as shown in FIG.

10(A), each luminance block has, in combination, both the data representing the lines of odd fields and that representing the lines of even fields. In the frame encoding mode, the four luminance blocks forming each macroblock are processed as a unit, and a single motion vector is determined for the four luminance blocks.

When the field encoding mode is selected, the circuit 52 changes the luminance blocks Y[1] and Y[2] from an arrangement as shown in FIG. 10(A) as received from the motion vector detecting circuit 50, for example, into pixels of lines of odd fields, changes the other luminance blocks Y[3] and Y[4] into pixels in lines of even fields as shown in FIG. 10(B), and provides an output signal in the form as shown in FIG. 10(B) to the arithmetic unit 53. In this case, an odd field motion vector corresponds to the two luminance blocks Y[1] and Y[2], while an even field motion vector corresponds to the other two luminance blocks Y[3] and Y[4].

The motion vector detecting circuit 50 provides signals representing the sum of absolute values of prediction errors for interframe and bidirectional predictive encoding, as well as a measure of the amount of data resulting from intraframe encoding when operating in the frame encoding mode, and similarly derived signals in the field encoding mode to the circuit 52. For simplicity, the foregoing data are referred to from time to time as prediction errors herein. The circuit 52 compares the sums of absolute values of prediction errors in the frame encoding mode and the field encoding mode, carries out a selection process corresponding to the mode having the smaller sum, and supplies the selected data to the arithmetic unit 53.

Practically, the process of arranging the data is carried out by the motion vector detecting circuit which supplies the data in an arrangement corresponding to the selected mode to the prediction mode switching circuit 52, and then the prediction mode switching circuit 52 provides the input signal as is to the arithmetic unit 53.

In the frame encoding mode, the color difference signal having, in combination, both data representing the lines of the odd fields and data representing lines of the even fields as shown in FIG. 10(A) are supplied to the arithmetic unit 53. In the field encoding mode, the respective upper halves (four lines) of the color difference blocks Cb[5] and Cr[6] are rearranged to include a color difference signal representing odd fields corresponding to the luminance blocks Y[1] and Y[2], and the respective lower halves (four lines) of the color difference blocks Cb[5] and Cr[6] are rearranged to include a color difference signal representing even fields corresponding to the luminance blocks Y[3] and Y[4] as shown in FIG. 10(B).

The motion vector detecting circuit 50 produces the sum of absolute values of prediction errors for use for determining a prediction mode for intraimage encoding, forward prediction, backward prediction and bilateral prediction for each macroblock by means of the prediction mode selecting circuit 54.

The difference between the absolute value |ΣAij| of the sum |Aij| of the signals Aij of a macroblock of a reference original image and the sum |ΣAij| of the absolute values |Aij| of the signals Aij of the macroblocks is calculated as the sum of absolute values of prediction errors for intraimage encoding. The sum Σ|Aij−Bij| of the absolute values |Aij−Bij| of the differences (Aij−Bij) between the signals Aij of the macroblock of the reference original image and the signals Bij of the macroblock of a predicted image is calculated as the sum of absolute values of prediction errors for forward prediction. The sums of absolute values of prediction errors for backward prediction and bilateral prediction are calculated in a similar manner, using predicted images different from that used for the calculation of the sum of absolute values of prediction errors for forward prediction.

These sums of absolute values are given to the prediction mode selecting circuit 54. The prediction mode selecting circuit 54 selects the smallest sum of absolute values of prediction errors among those given thereto as the sum of absolute value of prediction errors for inter-prediction, compares the smallest sum of absolute values of prediction errors and the sum of absolute values of prediction errors for intraimage prediction, selects the smaller sum of absolute values of the prediction errors, and selects an encoding mode corresponding to the selected smaller sum of absolute values of prediction errors; that is, the intraimage encoding mode is selected if the sum of absolute values of prediction errors for intraimage encoding is smaller, and, to the extent that these predictive encoding modes may be used (depending on the type of picture encoded), the forward prediction mode, the backward prediction mode or the bilateral prediction mode corresponding to the smallest sum of absolute values of prediction errors is selected if the sum of absolute values of prediction errors for inter-prediction encoding is smaller.

Thus, the motion vector detecting circuit 50 supplies the signals representing the macroblocks of the reference original image and having an arrangement as in FIG. 10(A) or FIG. 10(B) corresponding to the prediction mode selected by the circuit 52, i.e., either the frame encoding mode or the field prediction mode, through the circuit 52 to the arithmetic circuit 53, detects a motion vector between a predicted image corresponding to the encoding mode selected by the circuit 54 among those four modes and the reference original image, and gives the detected motion vector to a variable-length encoding circuit 58 and a motion compensating circuit 64. As mentioned above, a motion vector that makes the corresponding sum of absolute values of prediction errors smallest is selected.

The prediction mode selecting circuit 54 sets an intraframe (image) encoding mode, in which motion compensation is not performed, as an encoding mode while the motion vector detecting circuit 50 is reading the image data of an I picture from the forward original image area 51a, and connects the movable contact 53d of the switch of the arithmetic unit 53 to the fixed contact a thereof. Consequently, the image data of the I picture is applied to a DCT mode switching circuit 55.

The DCT mode switching circuit 55 provides data representing four luminance blocks having, in combination, lines of odd fields and those of even fields as shown in FIG. 11(A) (i.e., in a frame DCT mode) or data representing four luminance blocks each having lines of either an odd field or those of an even field as shown in FIG. 11(B) (in a field DCT mode) to a DCT circuit 56.

The DCT mode switching circuit 55 compares the coding efficiency of the frame DCT mode and that of the field DCT mode, and selects the DCT mode which provides better coding efficiency than the other by producing less data.

For example, the DCT mode switching circuit 55 produces a frame DCT mode data estimate by forming the data representing blocks having, in combination, lines of odd fields and those of even fields as shown in FIG. 11(A), calculating the differences between signals representing the vertically adjacent lines of odd fields and even fields, and calculating the sum of absolute values of the differences (or the sum of squares of the differences). The circuit 55 also produces a field DCT mode data estimate by forming the data representing blocks of lines of odd fields and those of lines of even fields as shown in FIG. 11(B), calculating the differences between the vertically adjacent lines of odd fields and those between the vertically adjacent lines of even fields, and calculating the sum of absolute values (or the sum of squares) of the former differences and the sum of absolute values (or the sum of squares) of the latter differences. The circuit 55 then compares the former and latter sums of absolute values, and selects a DCT mode corresponding to the smaller sum of absolute values; that is, the frame DCT mode is selected when the former sum of absolute value is smaller and the field DCT mode is selected when the latter sum of absolute value is smaller.

When the circuit 52 selects the frame encoding mode (FIG. 10(A)) and the DCT mode switching circuit 55 also selects the frame DCT mode (FIG. 11(A)), and as well when the circuit 52 selects the field encoding mode (FIG. 10(B)) and the DCT mode switching circuit 55 also selects the field DCT mode (FIG. 11(B)), the DCT mode switching circuit 55 need not change the arrangement of the data.

When the circuit 52 selects the field encoding mode (FIG. 10(B)) and the DCT mode switching circuit 55 selects the frame DCT mode (FIG. 11(A)), and as well when the circuit 52 selects the frame encoding mode (FIG. 10(A)) and the DCT mode switching circuit 55 selects the field DCT mode (FIG. 11(B)), the DCT mode switching circuit 55 rearranges the data. The circuit 52 provides a frame/field encoding flag indicating either the frame encoding mode or the field encoding mode to the DCT mode switching circuit 55 to instruct the DCT mode switching circuit 55 whether and how to rearrange the data.

The DCT mode switching circuit 55 provides data arranged according to the selected DCT mode to the DCT circuit 56 and supplies a DCT flag indicating the selected DCT mode to the variable-length coding circuit 58 and an inverse discrete cosine transformation circuit (IDCT) 61.

The arrangement of the data in the luminance blocks are substantially the same in the frame and field modes as determined by the circuit 52 (FIGS. 10(A) and 10(B), and the DCT mode switching circuit 55 (FIGS. 11(A) and 11(B).

When the circuit 52 selects the frame encoding mode, in which the blocks have both odd lines and even lines in combination, it is highly probable that the DCT mode switching circuit 55 will select the frame DCT mode, in which each of the blocks has only odd lines and even lines in combination. When the prediction mode switching circuit 52 selects the frame prediction mode, in which each of the blocks has odd lines or even lines, it is highly probable that the DCT mode switching circuit 55 will select the field DCT mode, in which the data of odd fields and that of even fields are separated from each other.

However, the DCT mode switching circuit 55 does not always select either the frame DCT mode or the field DCT mode in such a manner since the prediction mode switching circuit 52 determines the mode so that the sum of absolute values of prediction errors is the smallest, while the DCT mode switching circuit 55 determines the mode so that coding can be achieved with high efficiency.

The DCT mode switching circuit 55 provides image data representing an I picture to the DCT circuit 56 and the image data is transformed into DCT coefficients by DCT (discrete cosine transformation). The DCT coefficients are quantized at a quantizing step based on the amount of data stored in a transmission buffer memory 59 by a quantizing circuit 57, and the quantized DCT coefficients are supplied to the variable-length coding circuit 58.

The variable-length coding circuit 58 converts the image data (in this case, the data of the I picture) received from the quantizing circuit 57 into variable-length codes, such as Huffman codes, according to the quantizing step (scale) used for quantization by the quantizing circuit 57, and provides the variable-length codes to the transmission buffer memory 59.

The quantized DCT coefficients in the low-frequency range (DCT coefficients typically representing large power levels) are in the upper left-hand corner of the table of 8×8 DCT coefficients as shown in FIG. 7 due to the characteristics of DCT. Generally, a coefficient is coded in a combination of a run length of successive zeros (zero-run length) and a coefficient (level) by variable-length coding. A coding method using zero-run lengths and levels in combination is called a run length coding method. When coefficients are coded by a run length coding method, long zero-runs can be formed by transmitting the coefficients in zigzag scanning sequence as shown in FIG. 12, in which the numerals indicate the coefficients' sequence of transmission, so that the data can be compressed.

The variable-length coding circuit 58 also variable length encodes the quantizing step (scale) provided by the quantizing circuit 57, the encoding mode (intraimage mode, forward prediction mode, backward prediction mode or bilateral prediction mode) selected by the prediction mode selecting circuit 54, the motion vector determined by the motion vector detecting circuit 50, the frame/field encoding flag set by the circuit 52, and the DCT flag (frame DCT mode flag or field DCT mode flag) set by the DCT mode switching circuit 55 together with the zigzag scanned quantized data.

After storing the transmission data temporarily, the transmission buffer 59 sends out the transmission data in a bit stream at a constant bit rate and controls the quantizing scale by sending a quantization control signal corresponding to the amount of the residual data for each macroblock to the quantizing circuit 57. The transmission buffer memory 59 thus regulates the amount of data sent out in a bit stream in order to hold an appropriate amount of data (amount of data that will not cause overflow or underflow) therein.

For example, upon an increase in the amount of the residual data held in the transmission buffer memory 59 to an upper limit, the transmission buffer memory 59 provides a quantization control signal to increase the quantizing scale to be used by the quantizing circuit 57 so that the amount of quantized data produced by the quantizing circuit 57 will be decreased. Upon a decrease in the amount of the residual data held in the transmission buffer memory 59 to a lower limit, the transmission buffer memory 59 provides a quantization control signal to decrease the quantizing scale to be used by the quantizing circuit 57 so that the amount of quantized data produced by the quantizing circuit 57 will be increased.

The output bit stream of the transmission buffer memory 59 is combined with a coded audio signal, synchronizing signals and the like to produce a multiplexed signal, an error correction code is added to the multiplexed signal, the multiplexed signal is subjected to predetermined modulation, and then the modulated multiplexed signal is recorded in pits on a master disk with a laser beam controlled according to the modulated multiplexed signal. A stamping disk for duplicating the master disk is formed by using the master disk to mass-produce records, such as optical disks.

The data of the I picture provided by the quantizing circuit 57 is inversely quantized by an inverse quantizing circuit 60 at a step provided by the quantizing circuit 57. The output of the inverse quantizing circuit 60 is subjected to IDCT (inverse DCT) in an IDCT circuit 61, and the output of the IDCT circuit 61 is provided to the converting circuit 65. The converting circuit 65 converts the input data from the IDCT circuit 61 according to the DCT flag provided by the DCT mode switching circuit 55 and the frame/field encoding flag provided by the circuit 52 into the frame encoding mode format (FIG. 10(A)) or data of field encoding mode (FIG. 36(B)) so that the converted data matches the predicted image data provided by the motion compensating circuit 64, and then converted data is supplied to an adding circuit 62. Data provided by the adding circuit 62 is converted to the frame encoding mode format (FIG. 10(A)) according to the frame/filed encoding flag by a conversion circuit 66, and then the converted data is stored in a forward predicted image area 63a of a frame memory 63.

The frame memory 63 may be replaced by a field memory. When a field memory is used instead of the frame memory 63, the output data of the adding circuit 62 is converted into the field encoding mode format (FIG. 10(B)) by the converting circuit 66, because the data of each field is stored separately.

When sequentially processing input frames as, for example, I, B, P, B, P, B . . . pictures, the motion vector detecting circuit 50 processes the image data of the first input frame as an I picture, and then processes the image data of the third input frame as a P picture before processing the image data of the second input frame as a B picture, because the B picture requires backward prediction and the B picture cannot be decoded without using the P picture, i.e., to produce a backward predicted image.

After processing the I picture, the motion vector detecting circuit 50 starts processing the image data of the P picture stored in the backward original image area 51c and, as mentioned above, the motion vector detecting circuit 50 supplies the sum of absolute values of the interframe differences (prediction errors), and the corresponding intraframe value, for each macroblock to the circuit 52 and the prediction mode selecting circuit 54. The circuit 52 and the prediction mode selecting circuit 54 set a frame/field encoding mode for each macroblock as intraimage encoding or forward prediction, according to the sum of absolute values of prediction errors (and the corresponding intraframe value) for each macroblock of the P picture.

When the intraframe encoding mode is set, the movable contact 53d of the circuit 53 is connected to the fixed contact a. Consequently, the data, similarly to the data of the I picture, is provided through the DCT mode switching circuit 55, the DCT circuit 56, the quantizing circuit 57, the variable-length coding circuit 58 and the transmitting buffer memory 59 to a transmission line. The data is also supplied through the inverse quantizing circuit 60, the IDCT circuit 61, the converting circuit 65, the adding circuit 62 and the converting circuit 66 to the backward predicted image area 63b of the frame memory 63 for storage.

When the forward prediction mode is set, the movable contact 53d of the circuit 53 is connected to the fixed contact b, and the motion compensating circuit 64 reads the data of the I picture from the forward predicted image area 63a of the frame memory 63 and executes motion compensation according to a motion vector provided by the motion vector detecting circuit 50. When the prediction mode selecting circuit 54 selects the forward prediction mode, the motion compensating circuit 64 shifts the read address for a position corresponding to the macroblock being provided by the motion vector detecting circuit 50 in the forward predicted image area 63a according to the motion vector, reads the data from the forward predicted image area 63a and produces predicted image data. The motion compensating circuit 64 arranges the predicted image data in either the frame/field arrangement shown in FIG. 10A or 10B according to the frame/field encoding flag provided by the circuit 52.

The predicted image data provided by the motion compensating circuit 64 is provided to a subtracting circuit 53a. The circuit 53a subtracts the predicted image data of a macroblock given thereto by the motion compensating circuit 64 from the data of the corresponding macroblock of a reference original image provided by the circuit 52, and provides difference or prediction error data representing the differences between the received data through the DCT mode switching circuit 55, the DCT circuit 56, the quantizing circuit 57, the variable-length coding circuit 58 and the transmitting buffer memory 59 to the transmission line. The difference data is locally decoded by the inverse quantizing circuit 60, the IDCT circuit 61 and the converting circuit 65, and the locally decoded difference data is supplied to the adding circuit 62.

The predicted image data provided to the arithmetic unit 53a is supplied also to the adding circuit 62. The circuit 62 adds the predicted image data provided by the motion compensating circuit 64 to the difference data provided by the converting circuit 65 to reproduce the image data of the original (decoded) P picture. Since the image data of the original P picture is in one of the arrangements shown in FIGS. 10(A) and 10(B) by the circuit 52, a converting circuit 66 rearranges the image data according to the frame encoding mode as shown in FIG. 10(A) (or according to the field encoding mode shown in FIG. 10(B) when the memory 63 is instead a field memory) according to the frame/field encoding flag. The image data of the P picture is stored in the backward predicted image area 63b of the frame memory 63.

After the image data of the I picture and that of the P picture have been thus stored respectively in the forward predicted image area 63a and the backward predicted image area 63b, the motion vector detecting circuit 50 processes a B picture. The circuit 52 and the prediction mode selecting circuit 54 sets either the frame encoding mode or the field encoding mode as described above for each macroblock, and the circuit 54 sets the intraframe encoding mode, the forward prediction mode, the backward prediction mode or the bilateral prediction mode.

As mentioned above, when the intraframe mode or the forward prediction mode is set, the movable contact 53d is connected to the fixed contact a or b, respectively, and then the same process as that carried out for the P picture is carried out and data is transmitted.

When the backward prediction mode or the bilateral prediction mode is set, the movable contact 53d is connected to the fixed contact c or d, respectively.

When the movable contact 53d is connected to the fixed contact c for the backward prediction mode, the image data P picture or I picture is read from the backward predicted image area 63b, and the image data is motion compensated by circuit 64 according to a motion vector provided by the motion vector detecting circuit 50. When the backward prediction mode is set by the prediction mode selecting circuit 54, the motion compensating circuit 64 shifts the read address of the data in the backward predicted image area 63b based on the motion vector from a position corresponding to the position of a macroblock being provided by the motion vector detecting circuit 50, reads the data, produces predicted image data, and rearranges the data according the frame/field encoding to flag provided by the circuit 52.

The motion compensating circuit 64 supplies the predicted image data to a subtracting circuit 53*b*. The circuit 53*b* subtracts the predicted image data provided by the motion compensating circuit 64 from the data of the macroblock in the reference original image provided by the circuit 52 to obtain difference data representing the differences between the image data. The difference data is provided through the DCT mode switching circuit 55, the DCT circuit 56, the quantizing circuit 57, the variable-length coding circuit 58 and the transmitting buffer memory 59 to the transmission line.

When the movable contact 53*d* is connected to the fixed contact d in the bilateral prediction mode, the I or P picture data is read from the forward predicted image area 63*a* and the I or P picture data is read from the backward predicted image area 63*b*, and then the data of each image are motion compensated by the circuit 64 according to the motion vectors provided by the motion vector detecting circuit 50. When the prediction mode selecting circuit 54 sets the bilateral prediction mode, the motion compensating circuit 64 shifts the read addresses in the forward predicted image area 63*a* and the backward predicted image area 63*b* from positions corresponding to the position of the macroblock being provided by the motion vector detecting circuit 50 according to two motion vectors for the forward predicted image and the backward predicted image, respectively, reads data from the forward predicted image area 63*a* and the backward predicted image area 63*b*, and produces predicted image data. The predicted image data is rearranged according to the flag provided by the circuit 52.

The motion compensating circuit 64 supplies the predicted image data to a subtracting circuit 53*c*. The circuit 53*c* subtracts the mean of the predicted image data provided by the motion compensating circuit 64 from the data of the macroblock of the reference original image provided by the motion vector detecting circuit 50 to provide difference data through the DCT mode switching circuit 55, the DCT circuit 56, the quantizing circuit 57, the variable-length coding circuit 58 and the transmitting buffer memory 59 to the transmission line.

The image of the B picture is not stored in the frame memory 63 because the same is not used for forming predicted images.

When necessary, the banks of the forward predicted image area 63*a* and the backward predicted image area 63*b* of the frame memory 63 can be changed to provide the stored data for producing a forward predicted image and a backward predicted image, respectively, of a specified reference original image.

Although the encoder 7 has been explained as applied mainly to processing the luminance blocks, the macroblocks of the color difference blocks as shown in FIGS. 10(A) and 10(B), 11(A) and 11(B) can be similarly processed and transmitted. A motion vector for processing the color difference block is one half the motion vector of the corresponding luminance block with respect to both the vertical direction and the horizontal direction.

The decoder 9 will be described hereinafter with reference to FIG. 13. An input bit stream representing image data stored in the recording medium 8 of FIG. 1 such as an optical disk, is provided to the decoder 9. The input bit stream is transmitted through a receiving buffer memory 70 to a variable-length decoding circuit (IVLC) 71 for decoding to obtain quantized data (DCT coefficients), motion vectors, a prediction flag, a DCT flag and a quantization scale. The data (DCT coefficients) provided by the variable-length decoding circuit 71 is inversely quantized by an inverse quantizing circuit 72 to provide representative data. The step of inverse quantization is regulated according to the quantization scale provided by the variable-length decoding circuit 71.

For each block, 8×8 blocks of quantized reproduced values (DCT coefficients) are provided by the inverse quantizing circuit 72. An IDCT circuit 73 inverse quantizes the 8×8 coefficients blocks to obtain corresponding blocks each having 8×8 pixels. The output of the IDCT circuit 73 is rearranged according to a DCT flag and a prediction flag provided by the variable-length decoding circuit 71 by means of a converting circuit 77 in an arrangement coinciding with the arrangement of data provided by a motion compensating circuit 76. The output of the converting circuit 77 is supplied to an arithmetic unit 74.

When image data representing an I picture is supplied to an adding circuit 74, the adding circuit unit 74 gives the image data to a converting circuit 78, which in turn rearranges the image data according to the frame/field encoding flag provided by the variable-length decoding circuit 71 in the frame encoding mode as shown in FIG. 10(A), and in the field encoding mode as shown in FIG. 36(B) when a field memory is used instead of a frame memory 75, and stores the image data in the forward predicted image area 75*a* of the frame memory 75 to use the same for producing predicted image data for the next image received by the adding circuit 74. The image data is also supplied to a format conversion circuit 10 (FIG. 1).

When image data for a forward predicted P picture produced from the image data of the preceding frame is supplied to the circuit 74, the image data representing the preceding frame, an I picture, is read from the forward predicted image area 75*a* of the frame memory 75, subjected to motion compensation in a motion compensating circuit 76 according to a motion vector provided by the variable-length decoding circuit 71, processed according to the encoding mode for the respective macroblock and the image data is rearranged as shown in FIG. 10(A) or FIG. 10(B) according to the frame/field encoding flag. The circuit 74 adds the rearranged data and image data (difference data) provided by the converting circuit 77. The added data, i.e., the decoded image data of the P picture, is stored in the backward predicted image area 75*b* of the frame memory 75 for producing predicted image data for the next image received by adding circuit the 74 (that is, the image data of either a B or P picture).

When the image data representing a P picture has been intraimage encoded, the image data, similarly to that an I picture, is not processed by the circuit 74 but is stored in the backward predicted image area 75*b* as it is.

The P picture timewise succeeds a respective B picture, but is processed and transmitted before the B picture. Since the P picture is to be displayed after the B picture which is next received, the image data representing the P picture is not provided to the format converting circuit 10 at this time.

When the image data representing the next B picture is provided by the converting circuit 77, depending on the prediction mode signal supplied for each macroblock by the circuit, either the image data of the I picture stored in the forward predicted image area 75*a* of the frame memory 75

(in the forward prediction mode) or the image data of the P picture stored in the backward predicted image area 75b (in the backward prediction mode) is read or both images (in the bilateral prediction mode) are read. The image data read from memory is processed by the motion compensating circuit 76 according to the motion vector provided by the variable-length decoding circuit 71 and the motion-compensated image data is rearranged according to the frame/field encoding flag to produce a predicted image. When motion compensation is unnecessary (intraimage mode), a predicted image is not produced.

The arithmetic unit 74 adds the output of the converting circuit 77 and the motion-compensated image data and the sum produced by the circuit 44 is supplied to the format converting circuit 10 after restoration to line-sequential format according to the frame/field flag by the converting circuit 78.

Since the data supplied by circuit 74 is a B picture and is not used for predicting other images, this output is not stored in the frame memory 75.

After the image of the B picture has been provided, the image data of the P picture is read from the backward predicted image area 75b and provided through the motion compensating circuit 76 (without motion compensation), the circuit 74 and the converting circuit 78 (without rearrangement).

The color difference signals can be processed in a similar manner. When processing the color difference signals, a motion vector which is one-half the motion vector used for processing the luminance signal both with respect to the vertical direction and the horizontal direction, is used.

The image thus reproduced is subjected to D/A conversion to obtain a decoded high-resolution HDTV signal.

The decoder 9 shown in FIG. 13 is provided with a configuration comprising an inverse quantizing circuit 81, a converting circuit 89 and the associated circuits for obtaining a decoded quarter-resolution image (that is, a standard TV image) in addition to the configuration for obtaining the decoded HDTV signal. The inverse quantizing circuit 81 obtains representative data by the inverse quantization of the data provided by the variable-length decoding circuit 71 according to a quantizing scale provided by the variable-length decoding circuit 71 and supplies the representative data to a selecting circuit 82.

The selecting circuit 82 selects the 4×4 DCT coefficients shown in FIG. 8 from the 8×8 DCT coefficients shown in FIG. 7 to obtain quarter-resolution 4×4 DCT coefficient groups by thinning out or reducing the 8×8 pixel data in both the vertical direction and the horizontal direction.

An IDCT circuit 83 inverse transforms the input 4×4 DCT coefficients and provides the recovered data to the converting circuit 88. The converting circuit 88 rearranges the data according to the DCT flag and the frame/field encoding flag provided by a motion compensating circuit 86 so that the arrangement of the data coincides with the arrangement of a predicted image provided by the motion compensating circuit 86. The data rearranged by the converting circuit 88 is provided to an adding circuit 84. The motion compensating circuit 86 changes the banks of a frame memory 85 and motion-compensates the data stored in the frame memory 85 according to a prediction mode and a motion vector provided by the variable-length decoding circuit 71, and rearranges the image data according to the field/frame encoding flag as shown in the indicated one of FIG. 10(A) or FIG. 10(B) to produce predicted image data.

The data provided by the motion compensating circuit 86 is added to the output of the converting circuit 88 by the circuit 84. The data is rearranged for the frame encoding mode (or for the field encoding mode when a field memory is used instead of the frame memory 85) according to the frame/field encoding flag by the converting circuit 89 to provide standard TV image data. Since motion in the standard TV image is about half that in corresponding HDTV image, the motion vector provided by the variable-length decoding circuit 71 is reduced by half in a scaling circuit 87 and the reduced motion vector is supplied to the motion compensating circuit 86.

When the prediction mode selecting circuit 54 of the encoder 7 (FIG. 9) selects the frame encoding mode for the encoder 7, the decoder 9 is set to decode data encoded in the frame encoding mode. When the field encoding mode is selected for the encoder 7, the decoder 9 is correspondingly set. Thus, when the motion compensating circuit 64 of the encoder 7 (as well as the motion compensating circuit 76 of the decoder 9) produces a predicted image in the frame encoding mode, the motion compensating circuit 86 of the decoder 9 produces a predicted image in the frame prediction mode in cooperation with the scaling circuit 87 and, when the motion compensating circuit 64 (as well as the motion compensating circuit 76) produces a predicted image in the field prediction mode, the motion compensating circuit 86 produces a predicted image corresponding with the field encoding mode in cooperation with the scaling circuit 87.

The foregoing conventional image signal decoder uses motion vectors obtained simply by reducing motion vectors provided for decoding high-resolution image data, by means of the scaling circuit 87 for motion compensation when producing a low-resolution image. Accordingly, the data of a predicted macroblock produced by the motion compensating circuit 86 does not coincide exactly with the data of the corresponding macroblock obtained by DCT of data motion-compensated by means of the motion compensating circuit 64 of the encoder 7 (or by means of the motion compensating circuit 76 of the decoder 9), followed by extraction of the low-frequency components of the output of the motion compensating circuit 64 and subjecting the low-frequency components to IDCT. Therefore, drift occurs between the data produced by the motion compensating circuit 86 and the data obtained by the encoder 7, producing a mismatching error and, consequently, the data obtained by processing the data provided by the motion compensating circuit 86 by the adding circuit 84, i.e., the quarter-resolution SDTV image data, does not coincide exactly with the original HDTV image data.

If the interval between intrapictures is increased, the interval between the successive mismatching error resetting operations is increased, the mismatching errors accumulate in the frame memory 85, and the drift appears as noise on the screen which degrades the quality of the picture.

OBJECTS AND SUMMARY OF THE INVENTION

It is an object of the present invention to provide encoding and decoding methods and apparatus, as well as records, which alleviate the foregoing problems.

It is another object of the present invention to provide such methods, apparatus and records which provide improved picture quality.

In accordance with an aspect of the present invention, methods and systems for encoding an input image signal through transformation and predictive encoding, comprise the steps of and means for, respectively, producing first image difference data of first resolution through transformation and encoding of the input image signal based on first predicted image data of said first resolution, producing second predicted image data of second resolution relatively lower then said first resolution based on the first image difference data, producing third predicted image data of said second resolution based on the first predicted image data, producing mismatch error data based on differences between the second and third predicted image data, and encoding the mismatch error data.

In accordance with another aspect of the present invention, methods and systems for decoding an input encoded image signal including encoded first image difference data of first resolution and encoded mismatch error data corresponding to the encoded image difference data, comprise the steps of and means for, respectively, producing second image difference data based on the encoded first image difference data, the second image difference data having a second resolution lower than the first resolution, decoding the encoded mismatch error data to produce mismatch error data, producing first predicted image data of second resolution through predictive decoding of the imput encoded image signal, and reproducing an image signal of said second resolution based on the second image difference data, the mismatch error data and the first predicted image data.

In accordance with a further aspect of the present invention, methods and systems for decoding an input encoded image signal of first resolution produced through predictive encoding based on first predicted image data of said first resolution including a plurality of fields, the input encoded image signal including first image difference data, comprise the steps of and the means for, respectively, producing second image difference data based on the encoded first image difference data, the second image difference data having a second resolution relatively lower than the first resolution, reproducing image data of the second resolution including a plurality of fields, producing second predicted image data through motion compensation of the reproduced image data of the plurality of fields, at least some of the second predicted image data being produced through interpolation, the predicted interpolated image data each falling within a field corresponding with, and having a position corresponding with, respective data of the first predicted image data, and reproducing an image signal of said second resolution based on the second image difference data and the second predicted image data.

In accordance with yet another aspect of the present invention, a device-readable record storing image signals comprises: a record medium; first image difference data of first resolution stored on said record medium in encoded form, said first image difference data being obtained through transformation and encoding of an image signal based on first predicted image data of said first resolution; and mismatch error data stored on said record medium in encoded form, the mismatched error data being based on differences between (i) second predicted image data of second resolution relatively lower then said first resolution based on the first image difference data, and (ii) third predicted image data of said second resolution based on the first predicted image data.

The above, and other objects, are features and advantages of the present invention, will be apparent in the following detailed description of certain illustrative embodiments thereof which is to be read in connection with the accompanying drawings forming a part hereof, and wherein corresponding elements are identified by the same reference numerals in the several views of the drawings.

BRIEF DESCRIPTION OF THE DRAWINGS

FIG. 3 is a schematic illustration of a sequence of frame images for use in explaining data compression by an inter-picture encoding technique;

FIG. 5 is a schematic illustration for use in explaining I picture, P picture and B picture encoding techniques;

FIG. 7 is a table illustrating an arrangement of DCT image data components arranged in an 8×8 block format;

FIG. 8 is a table illustrating a 4×4 DCT component array of DC and low-frequency AC components extracted from the 8×8 block illustrated in FIG. 7;

FIGS. 10(A) and 10(B) are schematic illustrations of macroblock data arrangements in frame and field encoding modes, respectively;

FIGS. 11(A) and 11(B) are diagrams illustrating arrangements of the data in each macroblock in frame and field DCT modes, respectively;

FIG. 12 is a table for use in illustrating a zigzag scanning technique used for encoding 8×8 DCT data blocks;

FIG. 31 is a block diagram of a process for producing data for recording on a device-readable record in accordance with the process of FIG. 30.

DETAILED DESCRIPTION OF CERTAIN ADVANTAGEOUS EMBODIMENTS

Figure 1:
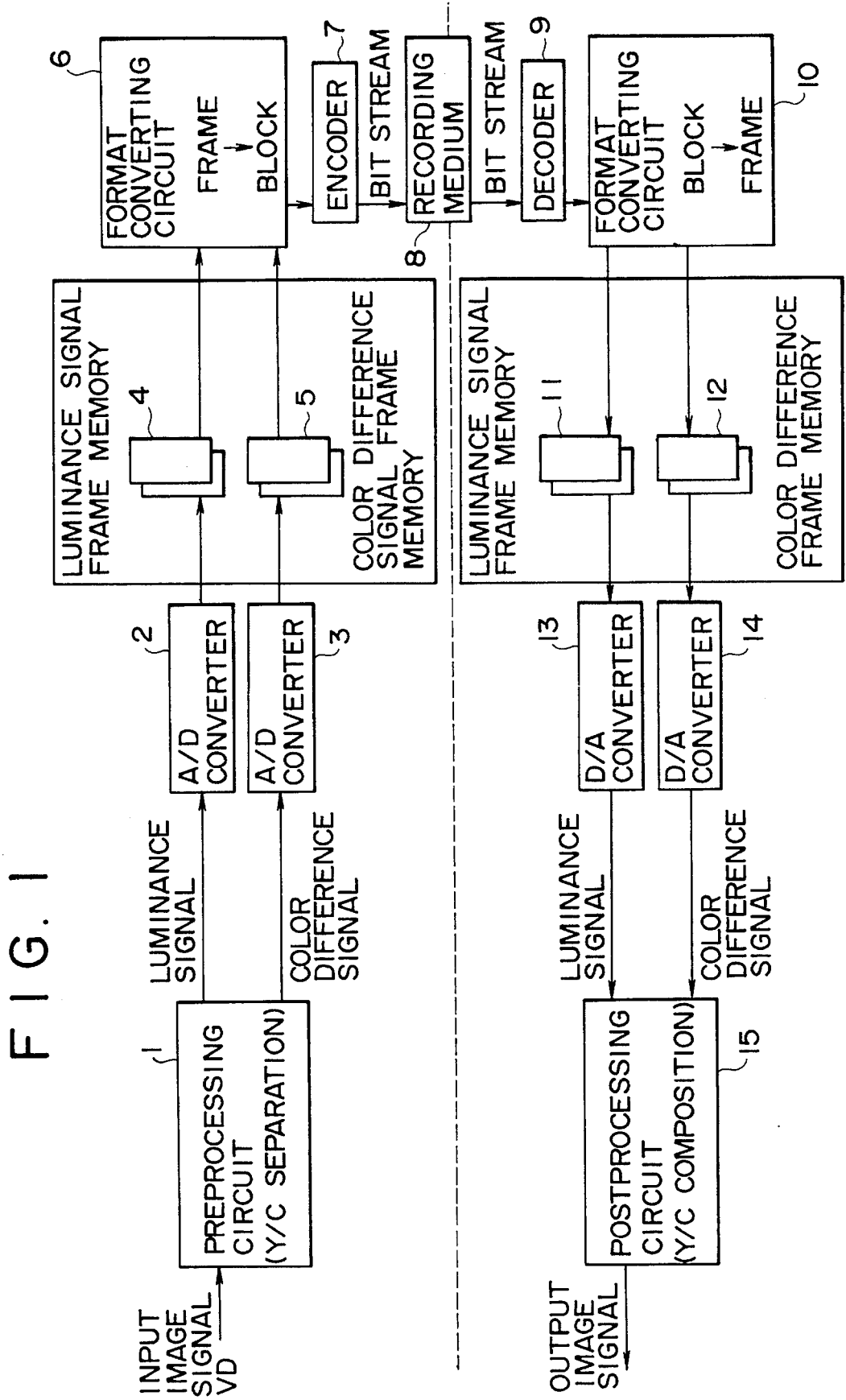
FIG. 1 is a block diagram of a conventional image signal encoder and a conventional image signal decoder.
Figure 2:
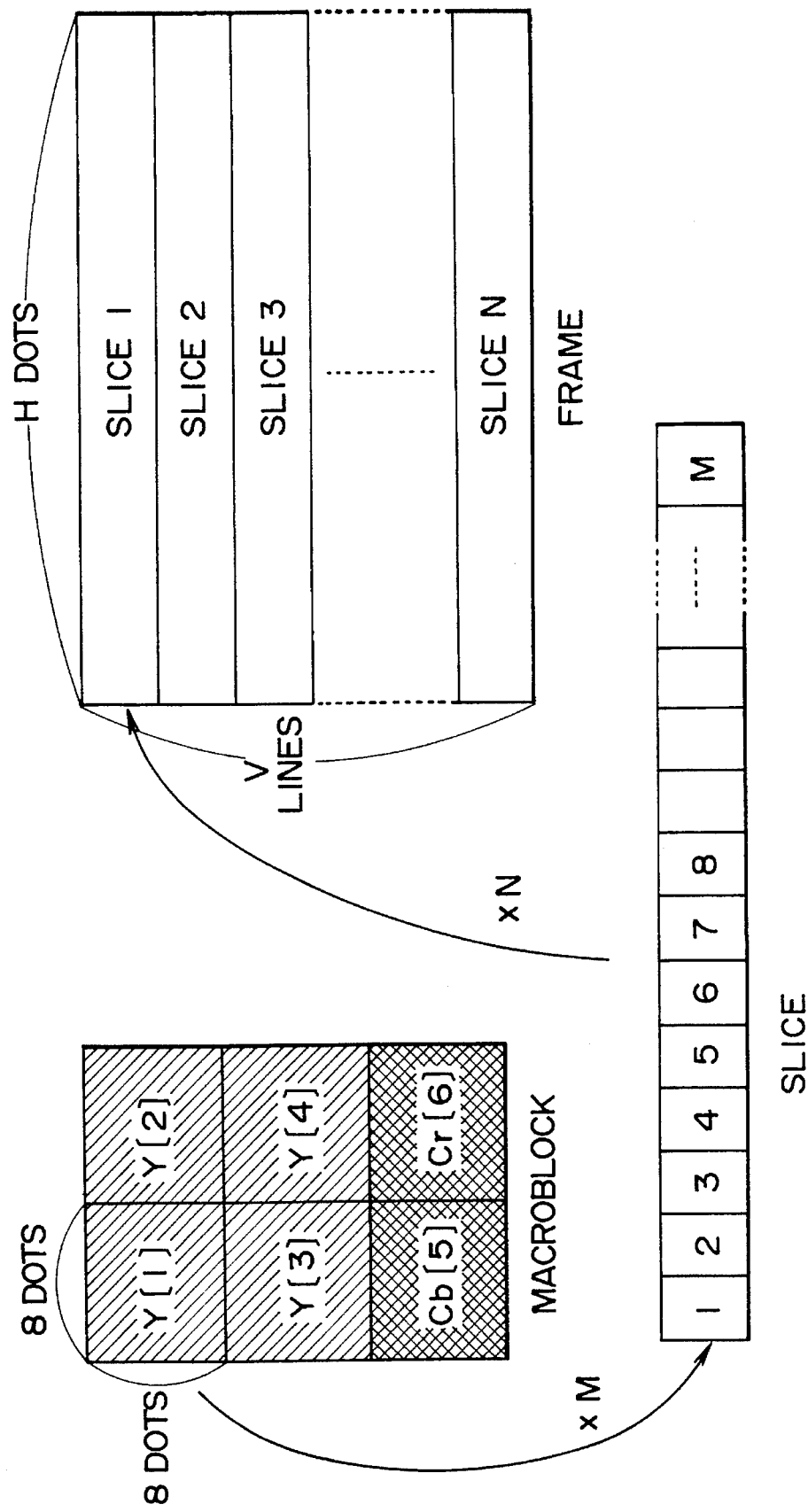
FIG. 2 is a schematic illustration for use in explaining an image data transmission format.
Figure 4A:
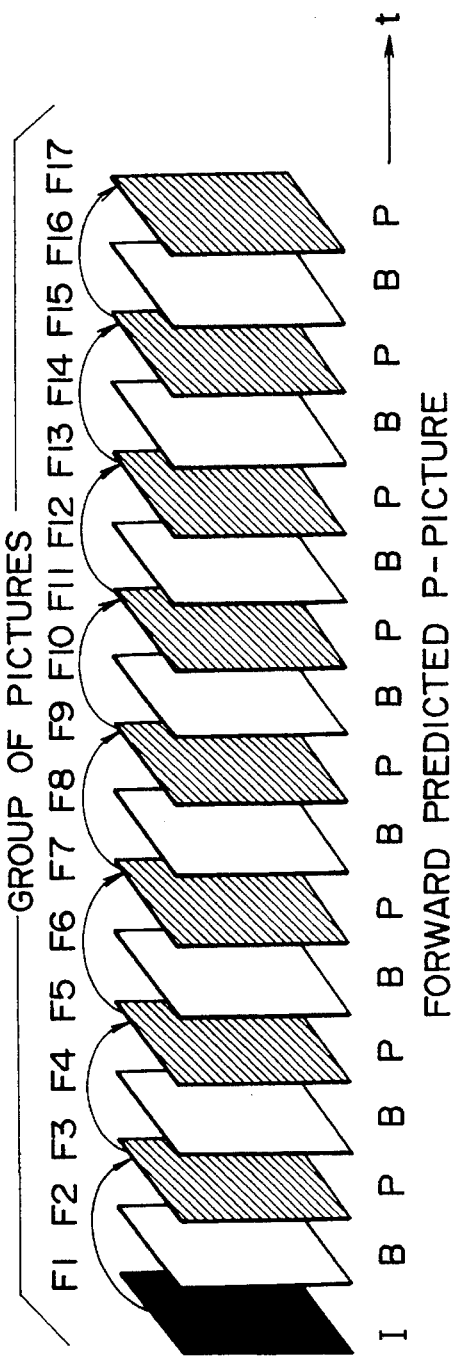
FIGS. 4(A) and 4(B) are schematic illustrations of an encoding sequence for images transmitted in successive picture groups.
Figure 4B:
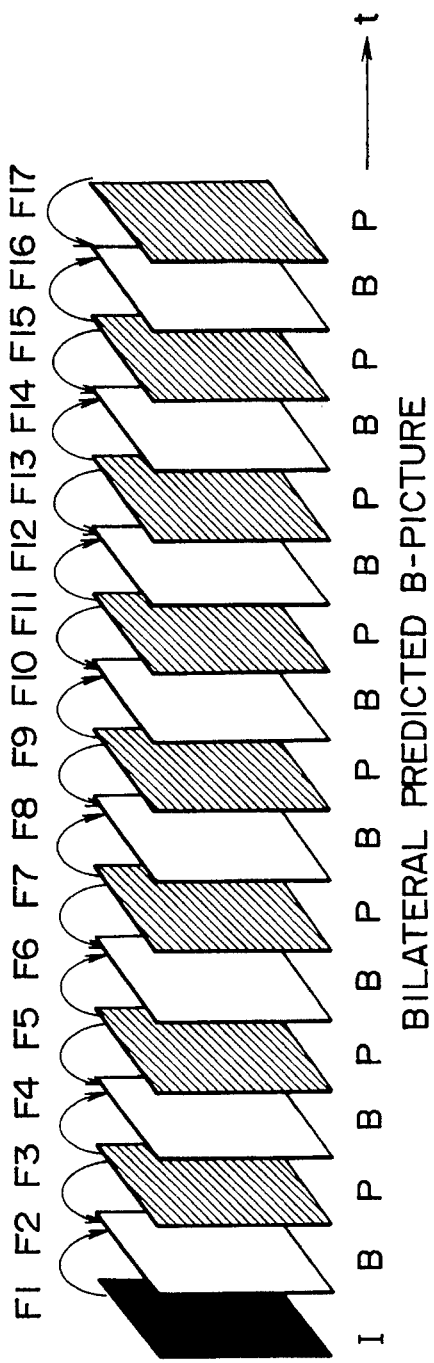
Figure 6:
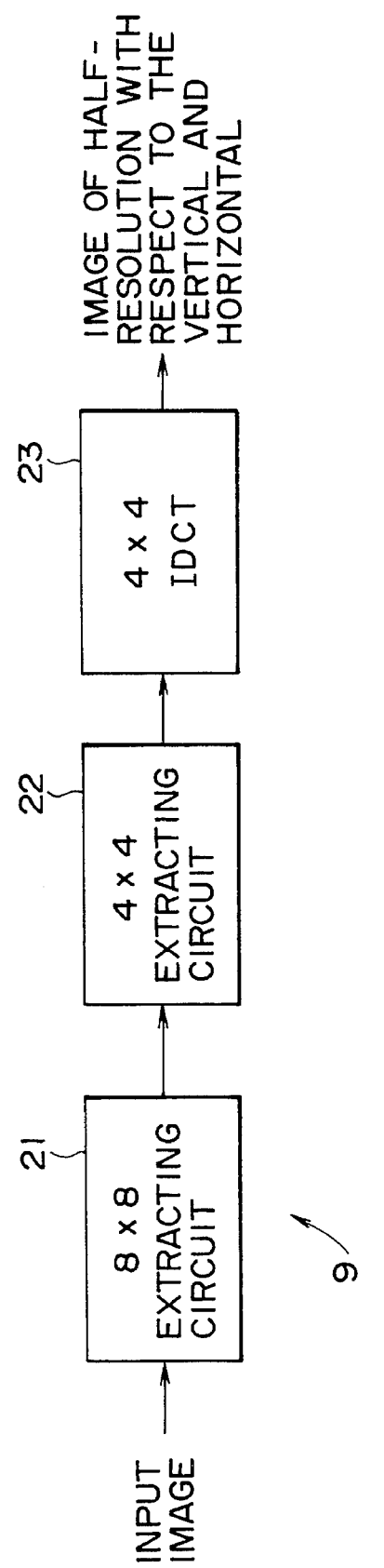
FIG. 6 is a block diagram of a portion of a decoder included in the system of FIG. 1.
Figure 13:
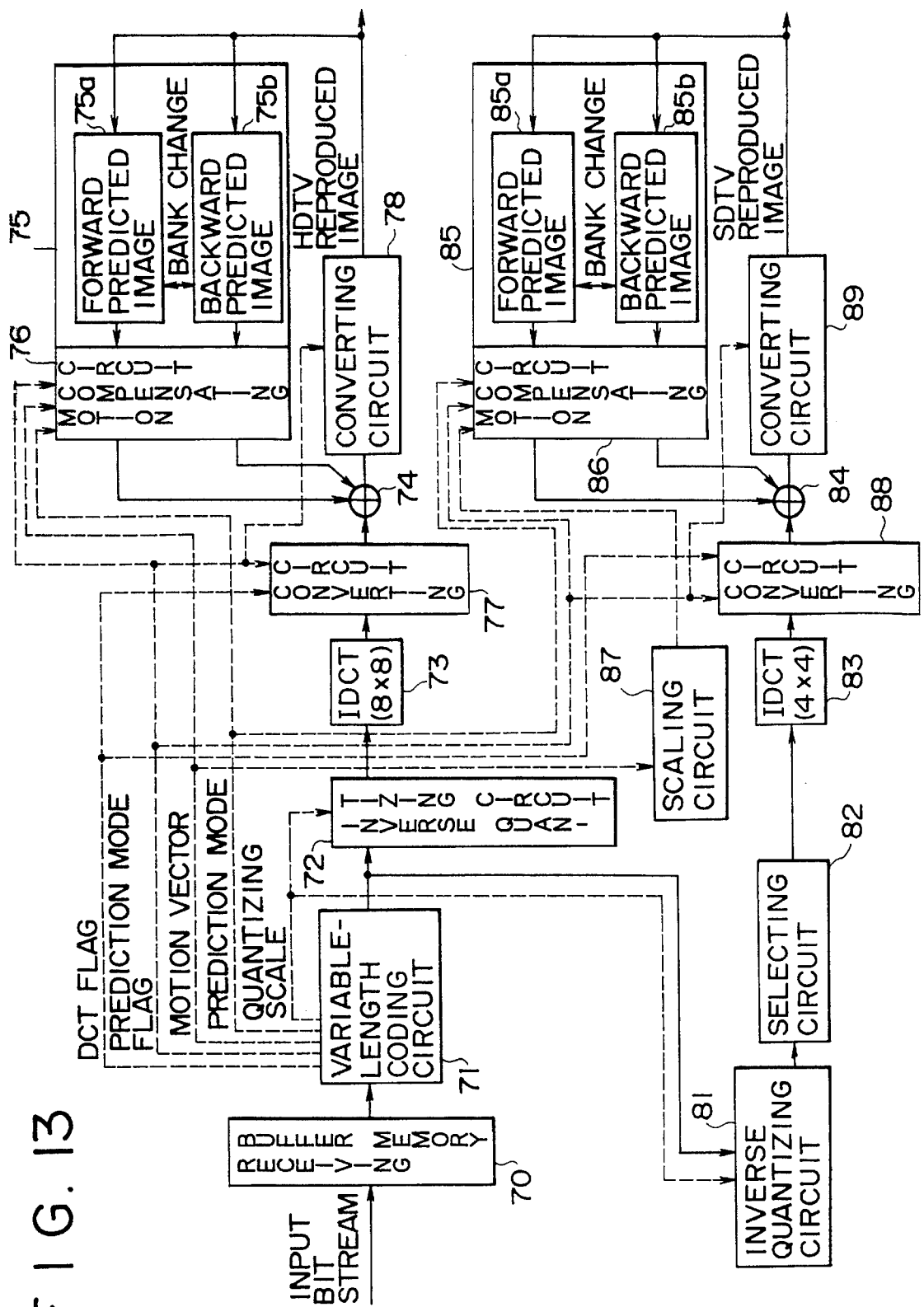
FIG. 13 is a block diagram of a decoder included in the system of FIG. 1.

Image signal encoders and image signal decoders embodying the present invention will be described hereinafter with reference to the accompanying drawings. Basically, the disclosed embodiments of image signal encoders and image signal decoders may be employed in the system of FIG. 1 in place of the encoder 7 and decoder 9. The encoders and decoders employed in the present invention will be described herein, in which elements like or corresponding to those of the conventional encoder shown in FIG. 9 and the conventional decoder shown in FIG. 13 are denoted by the same reference characters and further description thereof will be omitted for purposes of simplicity and clarity.

First, certain functional aspects of the encoders and the decoders employed in the present invention will be described with reference to FIGS. 14 and 15.

Figure 14:
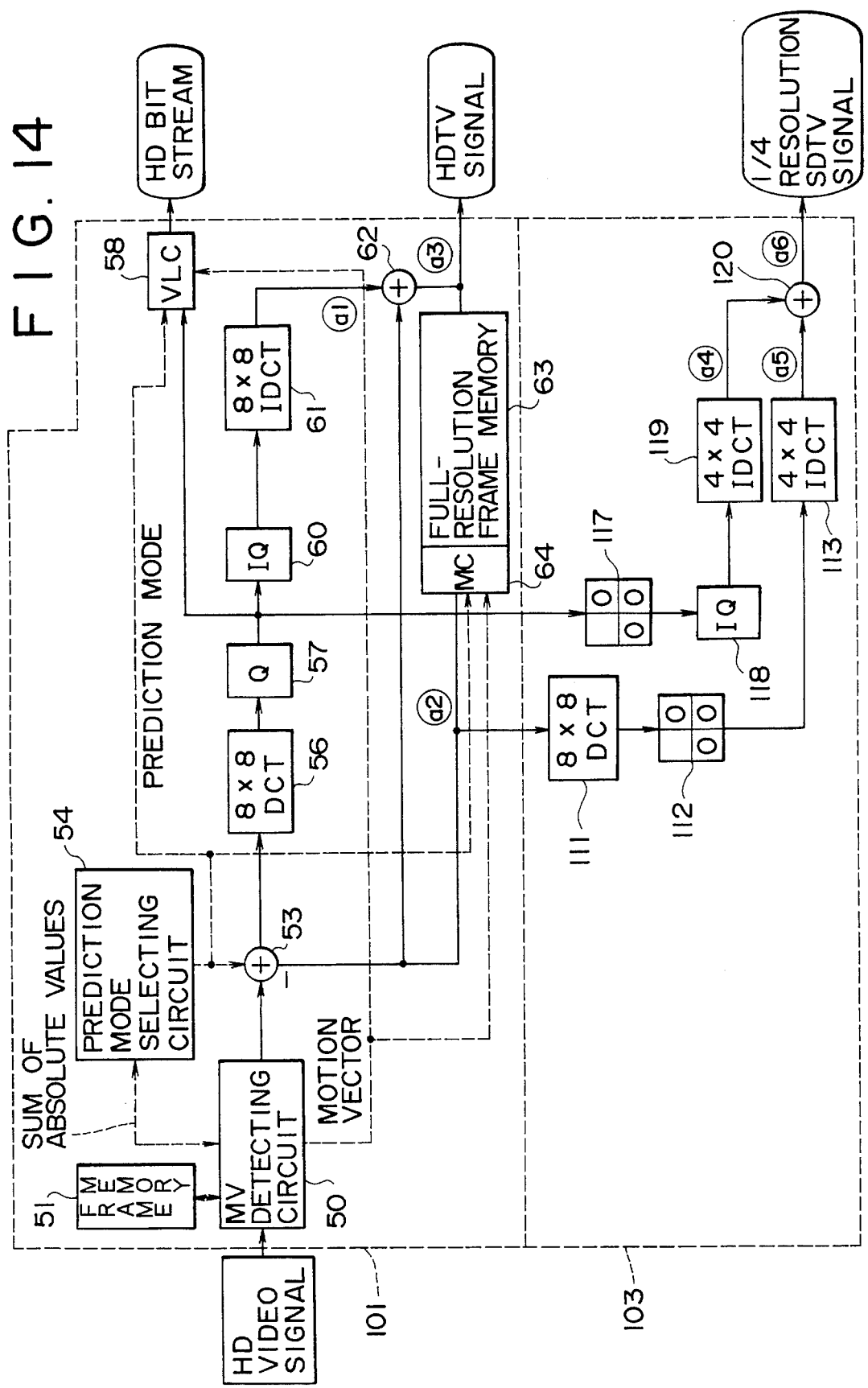
FIG. 14 is a block diagram of an image signal encoder for use in explaining certain aspects of the present invention.

Referring to FIG. 14, the encoder illustrated therein comprises a full-resolution encoding unit 101 and a quarter-resolution image forming unit 103. Basically, the full-resolution encoding unit 101 has the same configuration as the encoder 7 shown in FIG. 9, except that the full-resolution encoding unit 101 is not provided with the circuit 52 and the DCT mode switching circuit 55. Therefore, the full-resolution encoding unit 101 need not be provided with the converting circuits 65 and 66 of FIG. 9.

When a high-resolution HDTV signal, typically, a high-definition television signal, is applied to a motion vector (MV) detecting circuit 50, a variable-length coding circuit (VLC) 58 provides a HD bit stream obtained by coding the high-resolution HDTV signal. An HDTV local video signal a3 produced by locally decoding the high-resolution HDTV signal can be obtained from an output of an adding circuit 62 produced by adding an output al of an IDCT circuit 61 and an output a2 of a motion compensating circuit (MC) 64.

The quarter-resolution image forming unit 103 has a DCT circuit 111 which subjects the 8×8 pixel data a2 provided by the motion compensating circuit 64 to DCT. A selecting circuit 112 selects the 4×4 DC and lower frequency AC coefficients in the upper left-hand corner of the 8×8 DCT coefficients of each microblock provided by the DCT circuit 111, removes the rest of the DCT coefficients and supplies the selected 4×4 DCT coefficients to an IDCT circuit 113. Thus, the DCT coefficients corresponding to 4×4 pixel data groups (predicted image data) produced by thinning out 8×8 pixel data blocks by half with respect to the vertical direction and the horizontal direction can be obtained. The IDCT circuit 113 inverse transforms the input 4×4 DCT coefficients groups to produce 4×4 pixel data groups a5 as predicted image data to an adding circuit 120.

The output of a quantizing circuit 57 included in the full-resolution encoding unit 101 is supplied to a selecting circuit 117 included in the quarter-resolution image forming unit 103. The selecting circuit 117 extracts the 4×4 DC and lower-frequency AC components in the upper left-hand portion of the 8×8 DCT blocks to produce the 4×4 DCT components (difference data) by thinning out the 8×8 blocks by half with respect to the vertical direction and the horizontal direction. Each 4×4 DCT component group is inverse quantized by an inverse quantizing (IQ) circuit 118 to obtain representative data which are inverse transformed by an IDCT circuit 119 to obtain 4×4 pixel data groups a4 (difference data). The circuit 120 adds the 4×4 pixel data groups a4 and the output (predicted image data) a5 of the IDCT circuit 113 to produce data a6, which is quarter-resolution standard TV (SDTV) signals (decoded signals).

Figure 15:
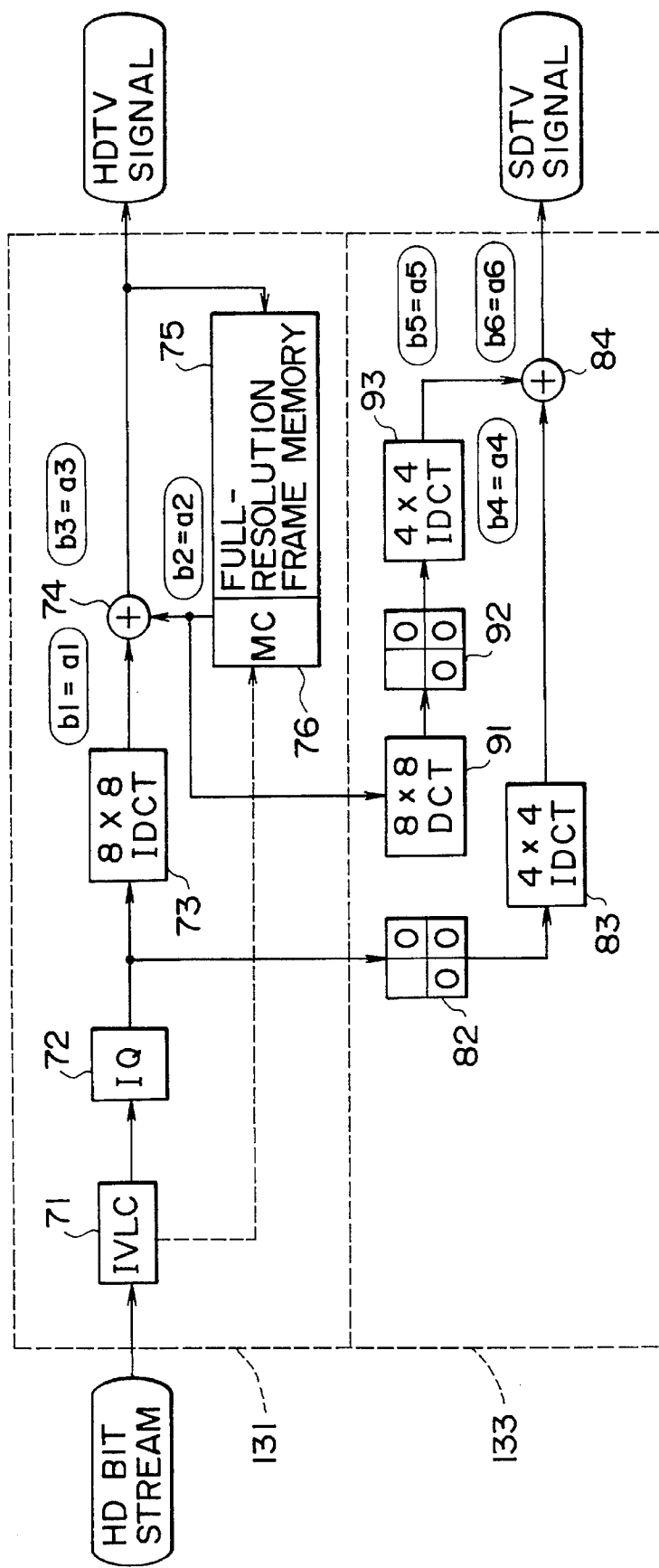
FIG. 15 is a block diagram of an image signal decoder for use in describing certain aspects of the present invention.

FIG. 15 shows the fundamental configuration of a decoder which decodes the HD bit stream provided by the encoder shown in FIG. 14 to obtain high-resolution HDTV signals and quarter-resolution SDTV signals.

The decoder comprises a full-resolution decoding unit 131 and a quarter-resolution image decoding unit 133. Basically, the full-resolution decoding unit 131 has the same configuration as the decoder 9 shown in FIG. 13 for decoding high-resolution HDTV signals, except that the decoder shown in FIG. 15 is not provided with the converting circuits 77 and 78.

An IDCT circuit 73 included in the full-resolution decoding unit 111 provides difference block data b1, i.e., 8×8 pixel data blocks, which are substantially the same as the difference block data al, i.e., the 8×8 pixel data blocks, provided by the IDCT circuit 61 of the full-resolution encoding unit 101. A motion compensating circuit 76 provides 8×8 pixel data blocks b2 of a predicted image, which are substantially the same as the 8×8 pixel data blocks a2 provided by the motion compensating circuit 64 of the full-resolution encoding unit 101 shown in FIG. 1. Accordingly, the decoded data a3 obtained by adding the difference data b1 and the predicted image data b2 by the arithmetic unit 74 is substantially the same as the decoded data a3 provided by the circuit 62 of the full-resolution image encoding unit 101 shown in FIG. 14; that is, the decoded data b3 represents HDTV signals.

A selecting circuit 82 included in the quarter-resolution image decoding unit 133 selects the 4×4 difference data DCT components included in the upper left-hand portion of the 8×8 DCT difference data provided by the inverse quantizing circuit 72 of the full-resolution decoding unit 131 and provides the same to an IDCT circuit 83. Thus, 4×4 DCT coefficients corresponding to the 4×4 pixel data groups (difference data) produced by thinning out the 8×8 pixel data by half with respect to both the vertical direction and the horizontal direction are obtained. The IDCT circuit 83 inverse transforms the 4×4 DCT coefficients to supply 4×4 difference pixel data b4 to an adding circuit 84.

A DCT circuit 91 included in the quarter-resolution image decoding unit 133 transforms the 8×8 predicted image data provided by the motion compensating circuit 76 to obtain 8×8 DCT coefficient blocks. A selecting circuit 92 selects 4×4 DCT coefficient groups including the DC and low-frequency AC components of the 8×8 DCT coefficient blocks provided by the DCT circuit 91 and provides the selected DCT coefficients to an IDCT circuit 93. Thus, 4×4 DCT coefficient groups corresponding to the 4×4 pixel data groups (predicted image data) produced by thinning out the 8×8 pixel data by half with respect to both the vertical direction and the horizontal direction can be obtained. The IDCT circuit 93 inverse transforms the 4×4 DCT coefficients to provide 4×4 predicted image data b5 to the adding circuit 84.

The difference data b4 provided by the IDCT circuit 83 is substantially the same as the difference data a4 provided by the IDCT circuit 119 of the encoder shown in FIG. 14, and the predicted image data b5 provided by the IDCT circuit 93 is substantially the same as the predicted image data a5 provided by the IDCT circuit 113 of the encoder shown in FIG. 14. Consequently, decoded data b6 obtained by adding the data b4 and b5 by the arithmetic unit 84 is substantially the same as the decoded data a6 provided by the circuit 120 of the encoder shown in FIG. 14. Therefore, the quarter-resolution SDTV signals provided by the circuit 84 do not contain any mismatching errors.

However, the decoder having the configuration as shown in FIG. 15 needs the full-resolution decoding unit 131 to decode the HDTV signals even when decoded HDTV signals are unnecessary, which makes the circuit configuration complex, increases the scale of the image signal coder and the image signal decoder and increases the cost of the same. A decoder in a preferred embodiment is a compact, low-cost decoder capable of decoding only the quarter-resolution SDTV signals and, when necessary, of decoding high-resolution HDTV signals.

Figure 16:
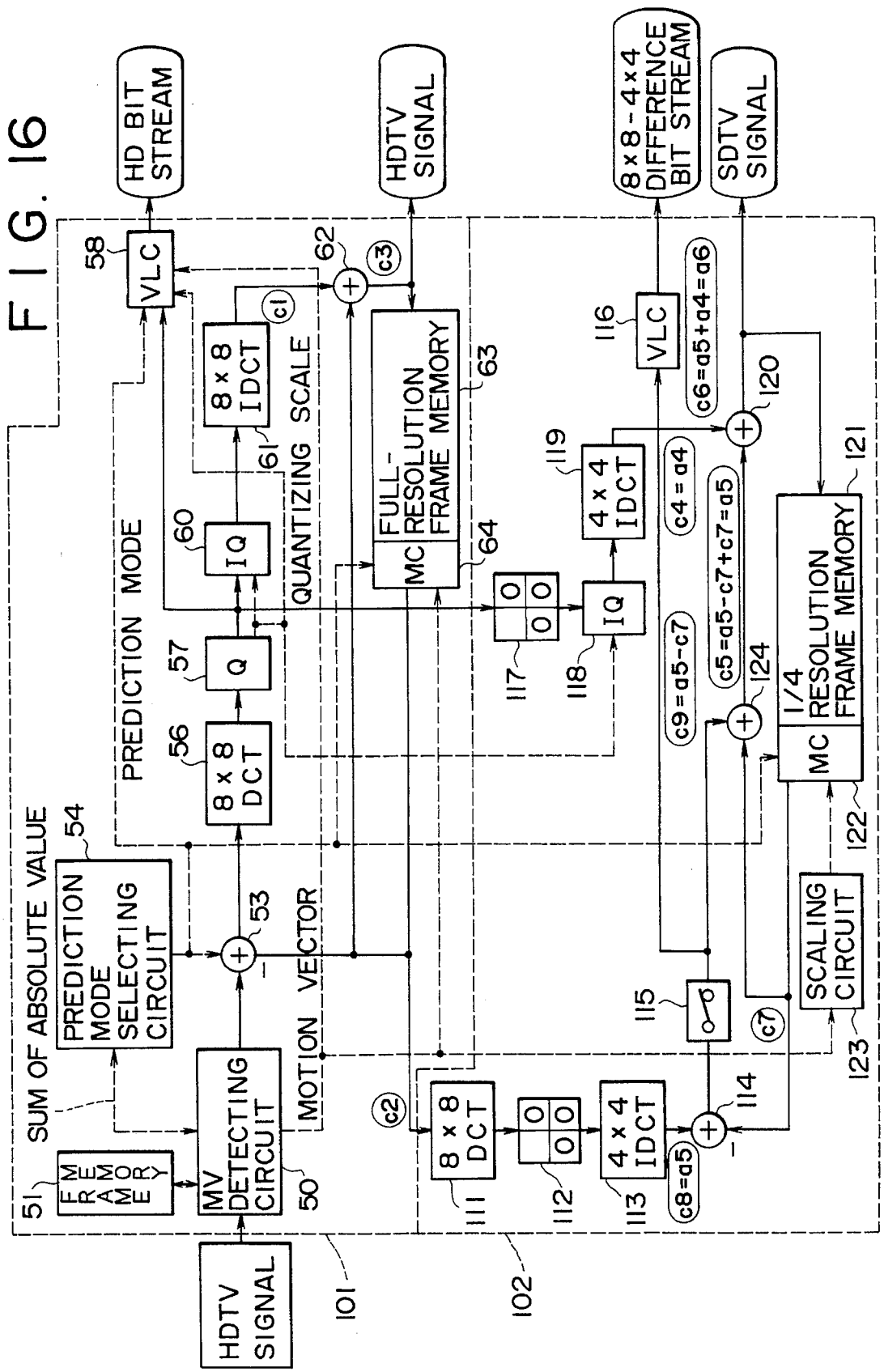
FIG. 16 is a block diagram of a first embodiment of an image signal encoder in accordance with the present invention.

Referring to FIG. 16, the encoder embodying the present invention comprises a full-resolution encoding unit 101 and a quarter-resolution mismatching error correcting encoding unit 102. The full-resolution encoding unit 101 has the same configuration as the full-resolution encoding unit 101 shown in FIG. 14. Accordingly, the respective output data c1, c2 and c3 of an IDCT circuit 61, a motion compensating circuit 64 and an arithmetic unit 62 included in the full-resolution encoding unit 101 of the encoder shown in FIG. 16 are equivalent to the respective output data a1, a2 and a3 of the IDCT circuit 61, the motion compensating circuit 64 and the arithmetic unit 62 of the full-resolution encoding unit 101 of the encoder shown in FIG. 14.

The quarter-resolution mismatching error correcting encoding unit 102 comprises, similarly to the quarter-resolution image forming unit 103 of the encoder shown in FIG. 14, a DCT circuit 111, a selecting circuit 112, an IDCT circuit 113, a selecting circuit 117, an inverse quantizing circuit 118, an IDCT circuit 119 and an adding circuit 120. The output data c8 of the IDCT circuit 113 is equivalent to the output data a5 of the IDCT circuit 113 of the encoder shown in FIG. 14, and the output data c4 of the IDCT circuit 119 is equivalent to the output data a4 of the IDCT circuit 119 of the encoder shown in FIG. 14.

This embodiment is provided with a quarter-resolution frame memory 121 to store the output data of the circuit 120. A motion compensating circuit 122 carries out motion compensation of the data stored in the quarter-resolution frame memory 121 and the output of the motion compensating circuit 122 is provided to a subtracting circuit 114 and an adding circuit 124. The circuit 114 subtracts predicted image data c7 provided by the motion compensating circuit 122 from predicted image data c8 provided by the IDCT circuit 113 to obtain difference data c9. Data c9 constitutes mismatching error data representing the differences between (1) 4×4 predicted image data groups included in a predetermined portion of the predicted image data produced from a high-resolution (full-resolution) data stored in a full-resolution frame memory 63, and (2) 4×4 predicted image data groups produced by processing quarter-resolution data stored in a quarter-resolution frame memory, i.e., quarter-resolution data decoded by using a motion vector provided by a scaling circuit 123.

The data c9 (equal to c8−c7, which is equivalent to a5−c7) represents differences between low-resolution (4×4) data derived from the predicted, motion compensated high resolution (8×8) data, and low resolution data produced through prediction using scaled-down motion vectors. The data c9 is transferred through a switch 115 to a variable-length coding circuit 116, and the coded data c9, i.e., a difference bit stream, 8×8–4×4 is transmitted to the decoder. The data c9 is also supplied to the adding circuit 124. The circuit 124 adds the predicted image data c7 provided by the motion compensating circuit 122 and the mismatching error data c9 to reproduce the data c5 (=c7+c9 which is equivalent to c7+a5−c7=a5) to the circuit 120. The data c5 is equivalent to the output data c5 of the IDCT circuit 113.

The circuit 120 adds the output predicted image data c5 (equivalent to a5) of the adding circuit 124 and the output difference data c4 (equivalent to a4) of the IDCT circuit 119 to produce quarter-resolution locally decoded data c6 (=c4+c5, equivalent to a4+a5=a6). The data c6 is stored in the quarter-resolution frame memory 121.

The scaling circuit 123 scales down a motion vector provided by a motion vector detecting circuit 50 by half with respect to both the vertical direction and the horizontal direction and supplies the scaled-down motion vector to the motion compensating circuit 122 for use in motion compensation when producing the predicted image data c7.

Although the output data c5 (equivalent to a5) of the circuit 124 is provided to the circuit 120 in the encoder shown in FIG. 16, in the alternative, the output data c8 (equivalent to a5) of the IDCT circuit 113 may be provided to the arithmetic unit 120. In the latter case, the circuit 124 may be omitted.

The switch 115 controls the amount of information represented by the mismatching error data c9 to be transmitted. Although an image having fewer errors can be decoded and a picture of higher quality can be formed when all the mismatching error data c9 is transmitted to the decoder, the transmission of all the mismatching error data c9 is incompatible with the efficient use of the transmission line. Therefore, the switch 115 is closed and opened properly to control the amount of the mismatching error data c9 to be transmitted.

For example, when transmitting P pictures, the switch 115 is closed every N×P pictures, where N is an integer. When N is increased, the amount of transmitted information decreases accordingly. However, if N is excessively large, virtually no difference bit stream is virtually transmitted and drift is liable to appear in the reproduced image. When N is reduced, the mismatching error can be reset every time the switch 115 is closed and drift can be suppressed. However, transmission efficiency is reduced as N is reduced. The value of N is determined properly from a practical point of view, based on an acceptable level of mismatching errors.

The switch 115 is opened when transmitting B pictures because mismatching errors are rarely produced in B pictures. Since motion compensation is not performed when transmitting I pictures, the state of the switch 115 is ignored at such times.

Figure 17:
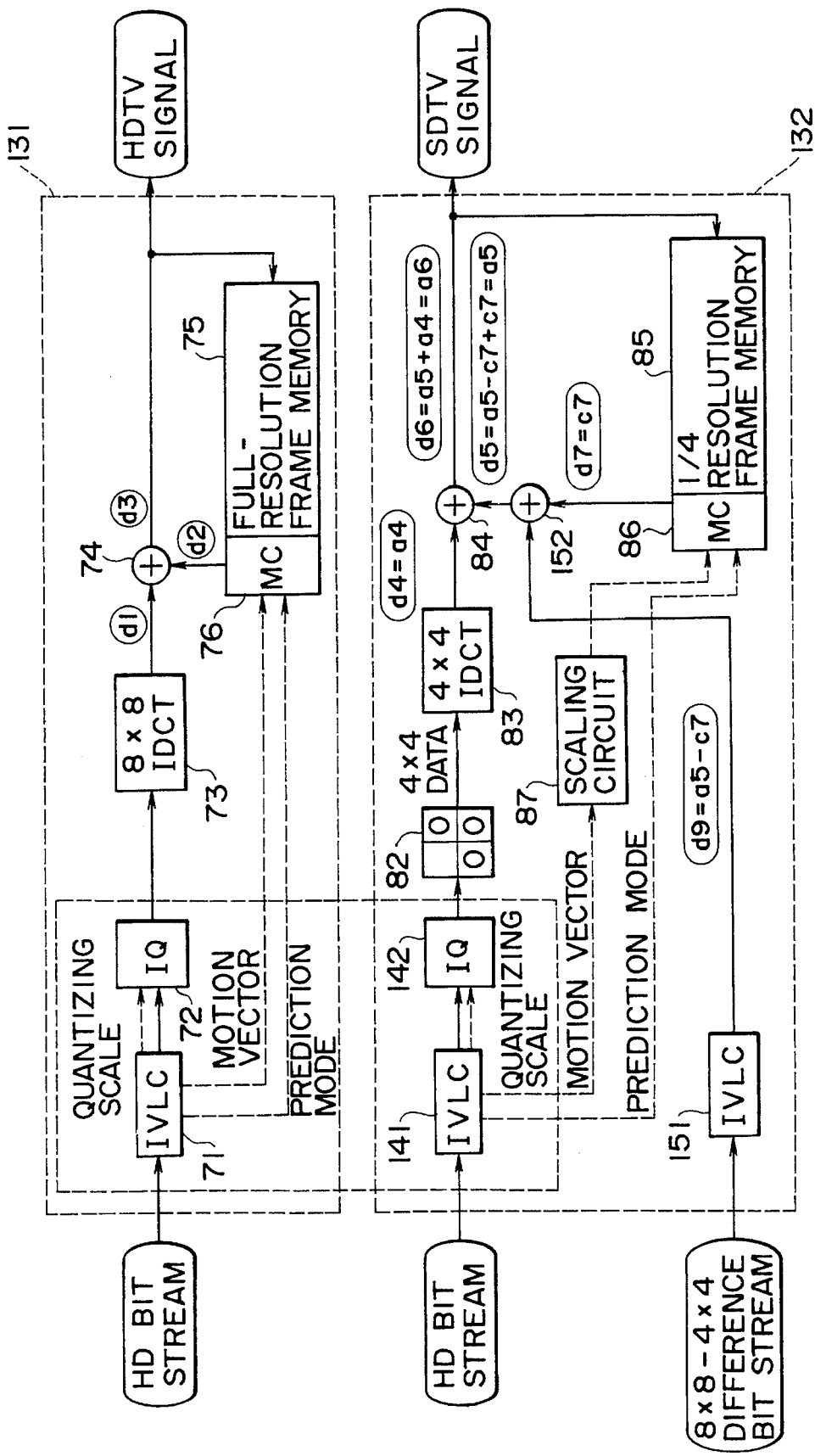
FIG. 17 is a block diagram of a first embodiment of an image signal decoder in accordance with the present invention.

FIG. 17 shows a decoder embodying the present invention for decoding a high definition (HD) bit stream and a difference bit stream encoded and transmitted by the encoder shown in FIG. 16. The decoder comprises a full-resolution decoding unit 131 and a quarter-resolution mismatching error correcting decoding unit 132. The configuration of the full-resolution decoding unit 131 is the same as that of the full-resolution decoding unit 131 of the decoder shown in FIG. 15 and hence the description thereof will be omitted. The full-resolution decoding unit 131 is necessary only when high-resolution HDTV signals are required. When only SDTV signals are required, the full-resolution decoding unit 131 may be omitted.

An HD bit stream is applied to a variable-length decoding circuit 141 included in the quarter-resolution mismatching error correcting decoding unit 132. The variable-length decoding circuit 141 carries out variable-length decoding of the HD bit stream, and supplies the decoded data and a quantizing scale to an inverse quantizing circuit 142. The inverse quantizing circuit 142 inverse quantizes the input data using the quantizing scale to obtain representative data and provides the representative data to a selecting circuit 82. The selecting circuit 82 selects the 4×4 DC and low-frequency AC component data from each 8×8 data block and supplies the same to an IDCT circuit 83. The IDCT circuit 83 inverse transforms the 4×4 data to produce difference data d4 which it supplies to an adding circuit 84.

A variable-length decoding circuit 151 processes the difference bit stream to decode the mismatching error data d9 (equivalent to a5–c7) which it supplies to an adding circuit 152. Data d7 (equivalent to c7) obtained by motion-compensating data stored in a quarter-resolution frame memory 85 by means of a motion compensating circuit 86 is also supplied to the circuit 152. A prediction mode signal representing a prediction mode provided by the variable-length decoding circuit 141 is provided thereby to the motion compensating circuit 86, and a half motion vector obtained by scaling down the motion vector provided by the variable-length decoding circuit 141 by half with respect to the vertical direction and the horizontal direction by means of a scaling circuit 87 is supplied to the motion compensating circuit 86.

The circuit 152 adds the predicted image data d9 output by the variable-length decoding circuit 151 and the output mismatching error data d9 of the motion compensating circuit 86 to correct the mismatching errors and provides corrected predicted image data d5 (equivalent to a5–c7+c7= a5). The output data d5 of the arithmetic unit 152 is equivalent to the output data a5 of the IDCT circuit 113 of the encoder shown in FIG. 14, which cancels out mismatching errors. Accordingly, decoded data d6 (equivalent to a5+a4=a6) obtained from the circuit 84 by adding the output difference data d4 (equivalent to a4) output by the IDCT circuit 83 and the output predicted image data d5 (equivalent to a5) output by the circuit 152 does not contain mismatching errors, so that SDTV signals including very little noise (drift) can be obtained.

When obtaining both the HDTV signals and the SDTV signals, the variable-length decoding circuit 141 and the inverse quantizing circuit 142 of the quarter-resolution mismatching error correcting decoding unit 132 can be used to carry out the functions of the variable-length decoding circuit 71 and the inverse quantizing circuit 72 of the full-resolution decoding unit 131.

Figure 18:
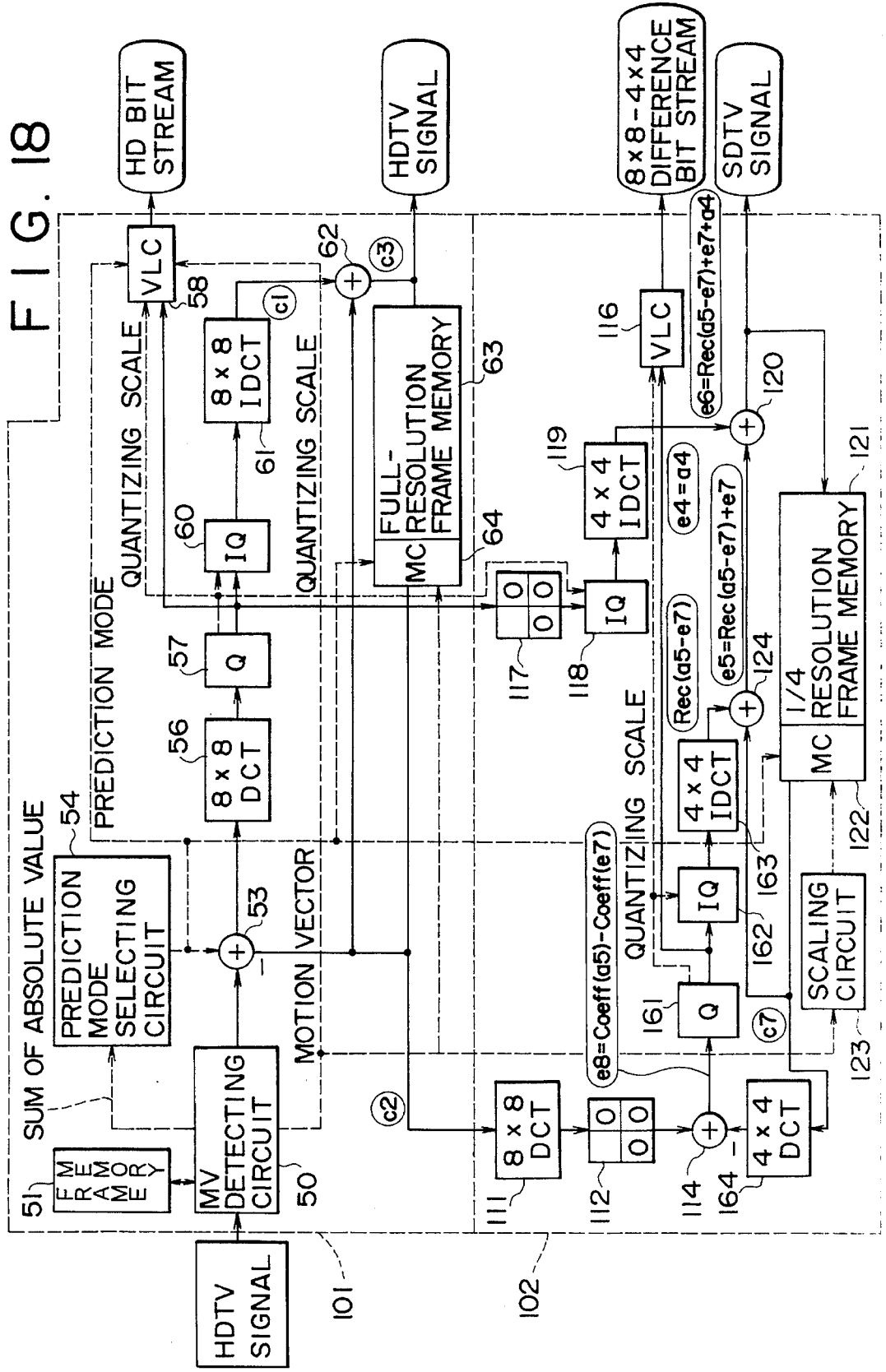
FIG. 18 is a block diagram of a second embodiment of an image signal encoder in accordance with the present invention.

FIG. 18 shows a second embodiment of an encoder according to the present invention. The encoder of FIG. 5 calculates DCT coefficients instead of calculating the mismatching errors in each of a plurality of image areas as pixel data, which is done by the encoder shown in FIG. 16. Accordingly, in the encoder shown in FIG. 18, a subtracting circuit 114 subtracts data Coeff(e7) in 4×4 DCT coefficient groups produced through DCT of predicted image data e7 provided by a motion compensating circuit 122 by means of a DCT circuit 164 each from a respective group of 4×4 DCT coefficients Coeff(a5) selected from the output of a DCT circuit 111 by means of a selecting circuit 112 to provide data e8 (equivalent to Coeff(a5)–Coeff(a7)).

The mismatching error signals are quantized by a quantizing circuit 161, and then coded by a variable-length coding circuit 116 to provide a difference bit stream. The amount of information transmitted in the difference bit stream can be regulated by controlling the quantizing characteristics of the quantizing circuit 161.

The mismatching error data provided by the quantizing circuit 161 is processed by inverse quantization to obtain representative data which are IDCT processed by an IDCT circuit 163 to obtain reproduced values (decoded values Rec(a5–e7)). The reproduced values Rec(a5–e7) are then supplied to a circuit 124 to produce data e5 (=Rec(a5–e7)+ a7). An adding circuit 120 adds the mismatching error data with the prediction errors provided by the motion compensating circuit 122 and the data e4 to eliminate mismatching errors and provides data e6 (=Rec(a5–e7)+a7+a4).

The encoder in the second embodiment is the same in other respects as the encoder in the first embodiment shown in FIG. 16.

Figure 19:
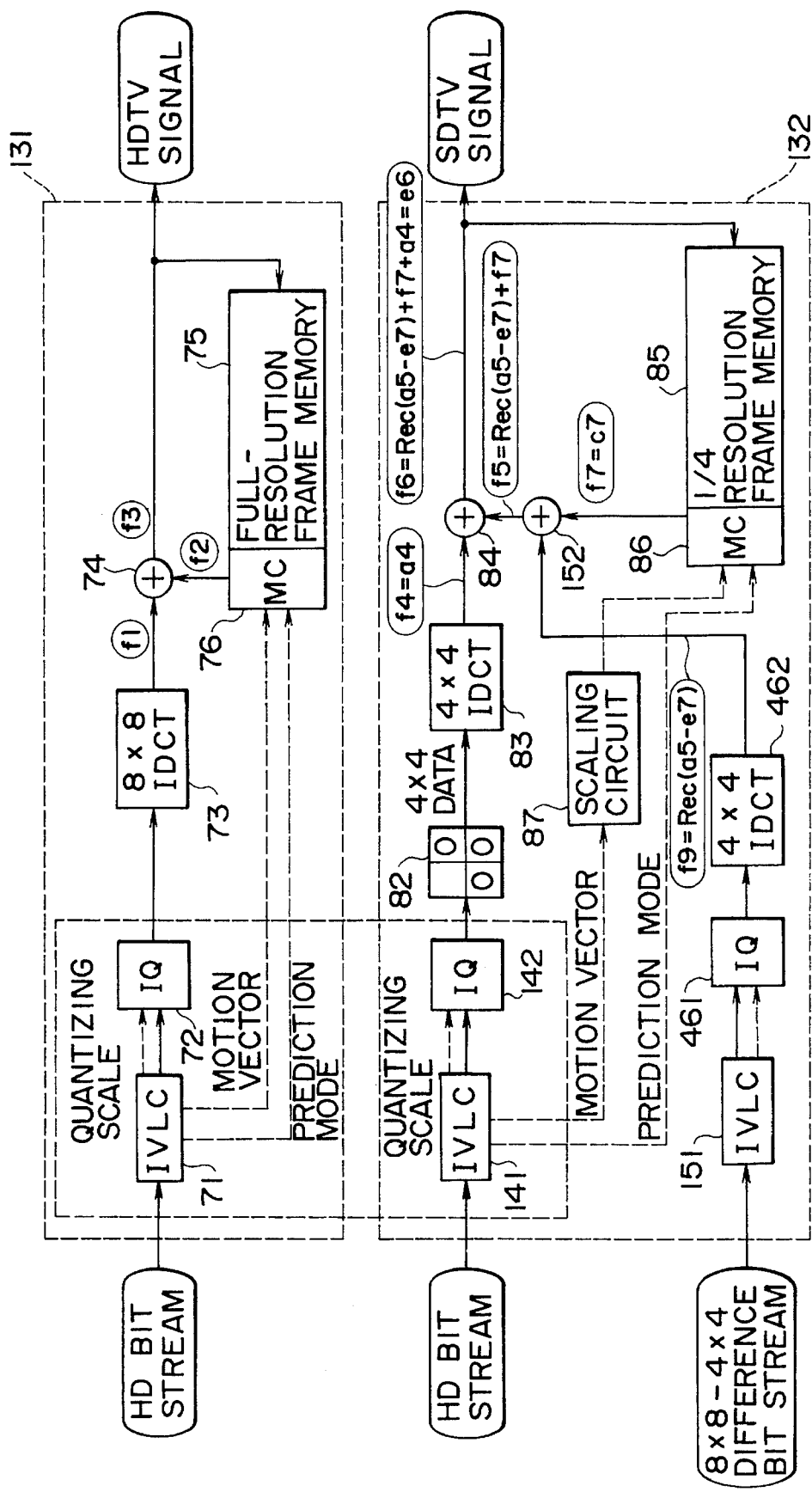
FIG. 19 is a block diagram of a second embodiment of an image signal decoder in accordance with the present invention.

FIG. 19 shows a decoder embodying the present invention for decoding the data provided by the encoder shown in FIG. 18. Although the decoder shown in FIG. 19 is the same in basic configuration as the decoder shown in FIG. 17, in the decoder shown in FIG. 19, a difference bit stream (mismatching errors) is decoded by a variable-length decoding circuit 151 and the decoded difference bit stream is processed for inverse quantization by an inverse quantizing circuit 461 to obtain representatives. An IDCT circuit 462 processes the representatives provided by the inverse quantizing circuit 461 for IDCT and gives output data f9 (=Rec(a5–e7)) to an arithmetic unit 152. The arithmetic unit 152 adds the output data of the IDCT circuit 462 and predicted image data f7 (=c7) provided by a motion compensating circuit 86 to cancel the mismatching errors and provides predicted image data f5 (=Rec(a5–e7)+f7).

The adding circuit 84 adds the predicted image data f5 provided by the circuit 152 and difference data f4 (equivalent to a4) provided by an IDCT circuit 83 and provides decoded image data f6 (equivalent to Rec(a5–e7)+f7+a4= e6) in 4×4 pixel blocks.

The locally decoded data e6 provided by the circuit 120 of the encoder shown in FIG. 18 and the decoded data f6 provided by the circuit 84 of the decoder shown in FIG. 19 are somewhat different from the data a6 provided by the circuit 120 of the encoder shown in FIG. 14. However, the data e6 (equivalent to f6) provided by the circuit 120 of the encoder shown in FIG. 18 is equal to the data f6 (equivalent to e6) provided by the circuit 84 of the decoder shown in FIG. 19, and there is no mismatching error between the data e6 and f6, that is, the predicted image provided by the encoder and the predicted image provided by the decoder always match each other and errors are not accumulated.

Figure 20:
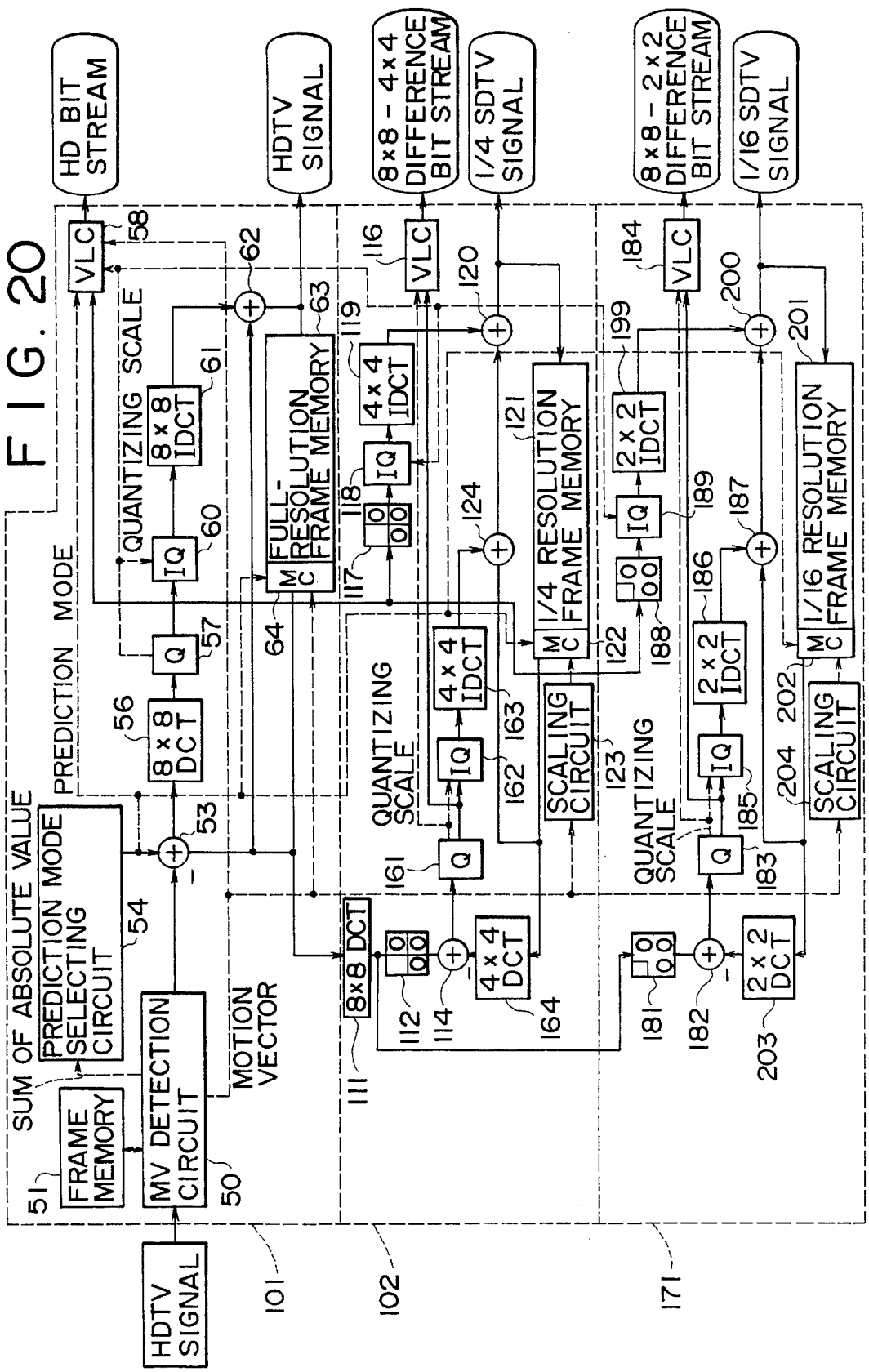
FIG. 20 is a block diagram of a third embodiment of an image signal encoder in accordance with the present invention.

FIG. 20 shows a third embodiment of an encoder according to the present invention. This encoder includes a full-resolution encoding unit 101 and a quarter-resolution mismatching error correcting encoding unit 102, which are the same in configuration and function as those included in the encoder shown in FIG. 18, as well as a sixteenth-resolution mismatching error correcting encoding unit 171.

Basically, the configuration of the sixteenth-resolution mismatching error correcting encoding unit 171 is the same as that of the quarter-resolution mismatching error correcting encoding unit 102, except that the sixteenth-resolution mismatching error correcting encoding unit 171 is provided with an extracting circuit 188 which separates the DC and low-frequency AC components in a 2×2 component array included in the upper left-hand portion of each of 8×8 data blocks provided by a quantizing circuit 57 included in the full-resolution encoding unit 101. The DCT coefficient arrays each correspond to a 2×2 pixel array produced by thinning out the 8×8 pixel data to ¼ resolution with respect to the vertical direction and the horizontal direction. The data provided by the extracting circuit 188 is inverse quantized by an inverse quantizing circuit 189 to obtain representative data which are transformed to the time domain by an IDCT circuit 199 to obtain difference data which it provides to the adding circuit 200.

A selecting circuit 181 selects the DC and low frequency AC components in a 2×2 component array included in the upper left-hand portion of each of 8×8 DCT component blocks of predicted image data provided by the DCT circuit 111 included in the quarter-resolution mismatching error correcting encoding unit 102, and supplies the selected 2×2 DCT coefficients to a subtracting circuit 182. Thus, DCT coefficients corresponding to 2×2 pixel blocks of predicted image data produced by thinning out or reducing the 8×8 predicted image data by a factor of 4 both with respect to the vertical direction and the horizontal direction, are obtained. Also supplied to the circuit 182 are DCT data including DC and low frequency AC components in 2×2 component arrays obtained by motion compensation of data stored in a sixteenth-resolution frame memory 201 by means of a motion compensating circuit 202 and discrete cosine transformation of the data output by the motion compensating circuit 202 by means of a DCT circuit 203. The subtracting circuit 182 subtracts the output of the DCT circuit 203 from the output of the selecting circuit 181 to produce mismatching error signals. A quantizing circuit 183 quantizes the mismatching error signals, and a variable-length coding circuit 184 encodes the output of the quantizing circuit 183 to provide a difference bit stream (designated 8×8–2×2 in FIG. 20).

The output of the quantizing circuit 183 is inverse quantized by means of an inverse quantizing circuit 185 to obtain representative data which, in turn, are inverse transformed by an IDCT circuit 186, the output of the IDCT circuit 186 being supplied to an adding circuit 187. The circuit 187 adds the 2×2 predicted image data provided by the motion compensating circuit 202 and the 2×2 mismatching error data provided by the IDCT circuit 186 to correct the mismatching errors in the predicted image data and provides the corrected predicted image data to an adding circuit 200.

The adding circuit 200 adds the 2×2 difference data provided by the IDCT circuit 199 and the corrected 2×2 predicted image data provided by the adding circuit 187 to provide locally decoded sixteenth-resolution SDTV signals. The output of the circuit 200 is stored in the sixteenth-resolution frame memory 201. A motion vector obtained by scaling down a motion vector provided by a motion vector detecting circuit by a factor of 4 both with respect to the vertical direction and the horizontal direction is supplied to the motion compensating circuit 202. The motion compensating circuit 202 carries out motion compensation according to the motion vector thus received.

In the third embodiment, an HD bit stream, a difference bit stream representing mismatching errors between each block of 8×8 pixel data and a corresponding block of 4×4 pixel data, as well as a difference bit stream (8×8–2×2) representing mismatching errors between the 8×8 pixel blocks and respective blocks of 2×2 pixel data are transmitted.

In the third embodiment, the amount of information represented by the (8×8–2×2) difference bit stream can be regulated by controlling the quantizing characteristics of the quantizing circuit 183.

Figure 21:
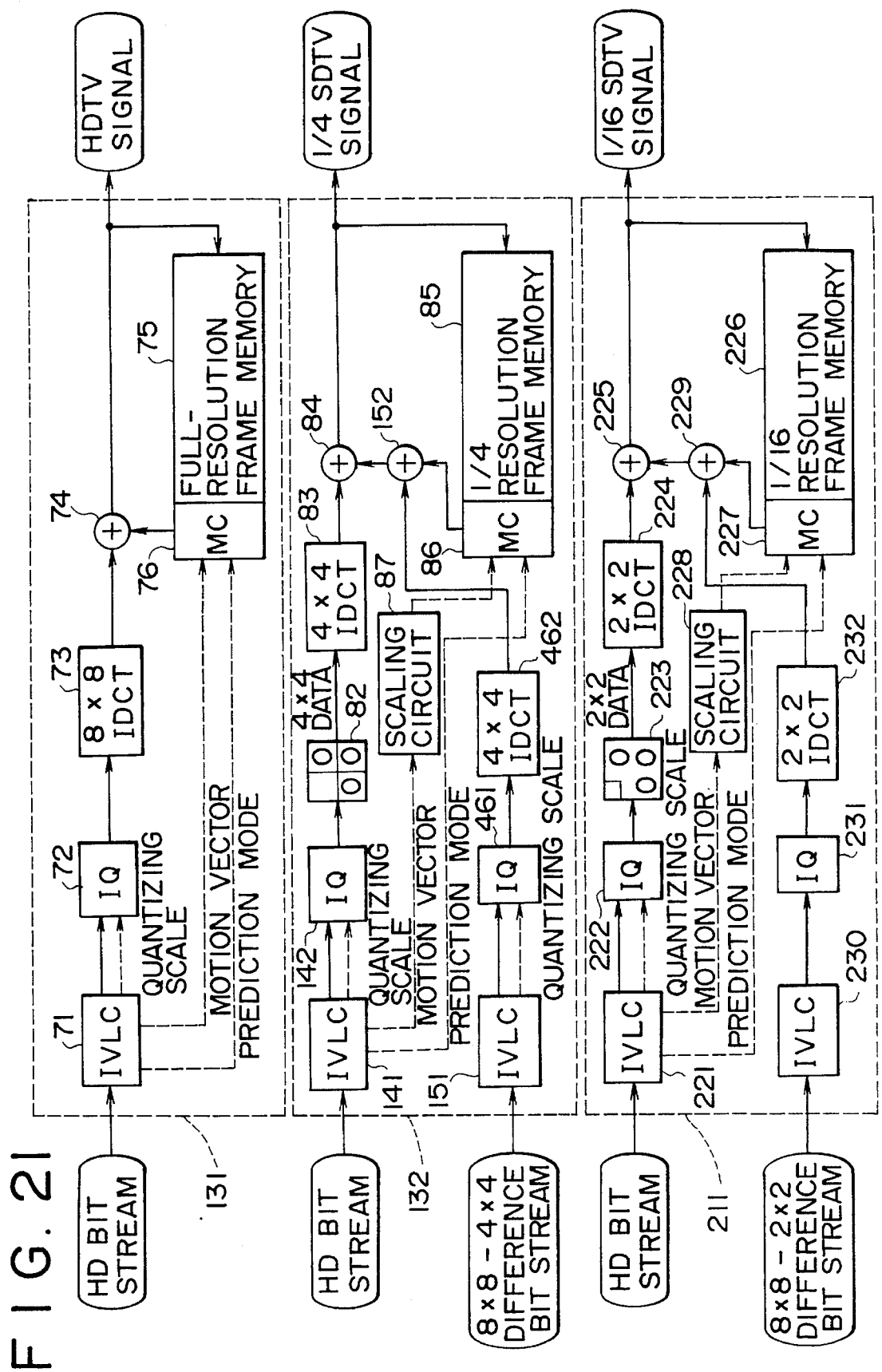
FIG. 21 is a block diagram of a third embodiment of an image signal decoder in accordance with the present invention.

FIG. 21 shows a third embodiment of a decoder according to the present invention for decoding the data transmitted by the encoder shown in FIG. 20. The decoder in the third embodiment is provided, in addition to a full-resolution decoding unit 131 and a quarter-resolution mismatching error correcting decoding unit 132, which are the same in configuration as those of the decoder shown in FIG. 19, with a sixteenth-resolution mismatching error correcting decoding unit 211.

In the sixteenth-resolution mismatching error correcting decoding unit 211, an HD bit stream is decoded by a variable-length decoding circuit 221, and the output data of the variable-length decoding circuit 221 is inverse quantized by an inverse quantizing circuit 222 to obtain representative data. A selecting circuit 223 separates 2×2 array DCT coefficients included in the upper left-hand portion of each 8×8 DCT coefficient block provided by the inverse quantizing circuit 222. Thus, 2×2 DCT coefficient arrays corresponding to 2×2 pixel arrays (difference data) produced by thinning out the 8×8 pixel data by a factor of 4 both with respect to the vertical direction and the horizontal direction, are obtained. The data output by the selecting circuit 223 is inverse transformed by an IDCT circuit 224, and the output of the IDCT circuit 224 is supplied to an adding circuit 225.

The motion vector provided by the variable-length decoding circuit 221 is scaled down by a factor of 4 both with respect to the vertical direction and the horizontal direction by means of a scaling circuit 228, and the scaled-down motion vector is provided to a motion compensating circuit 227. The motion compensating circuit 227 carries out motion compensation of the data stored in a sixteenth-resolution frame memory 226 according to the motion vectors received thereby and data representing a prediction mode provided by the variable-length decoding circuit 221 to produce a predicted image represented by data in 2×2 pixel arrays to an adding circuit 229.

The (8×8×2×2) difference bit stream is decoded by a variable-length decoding circuit 230, and then the output of the variable-length decoding circuit 230 is inverse quantized by an inverse quantizing circuit 231 to obtain representative data. The output of the inverse quantizing circuit 231 is inverse transformed by an IDCT circuit 232 and the output of the IDCT circuit 232 is supplied to the circuit 229. The circuit 229 adds mismatching error signals provided by the IDCT circuit 232 representing differences between the 8×8 block data and the 2×2 block data, and the predicted image data provided by the motion compensating circuit 227 to cancel the mismatching errors and provides corrected predicted image data to the 225. The circuit 225 adds the corrected predicted image data provided by the circuit 229 and the difference data provided by the IDCT circuit 224 to provide sixteenth-resolution SDTV data.

The encoder shown in FIG. 20, similarly to the encoder shown in FIG. 16, may substitute the switch 115 of FIG. 3 for the quantizing circuits 161 and 183.

Figure 22:
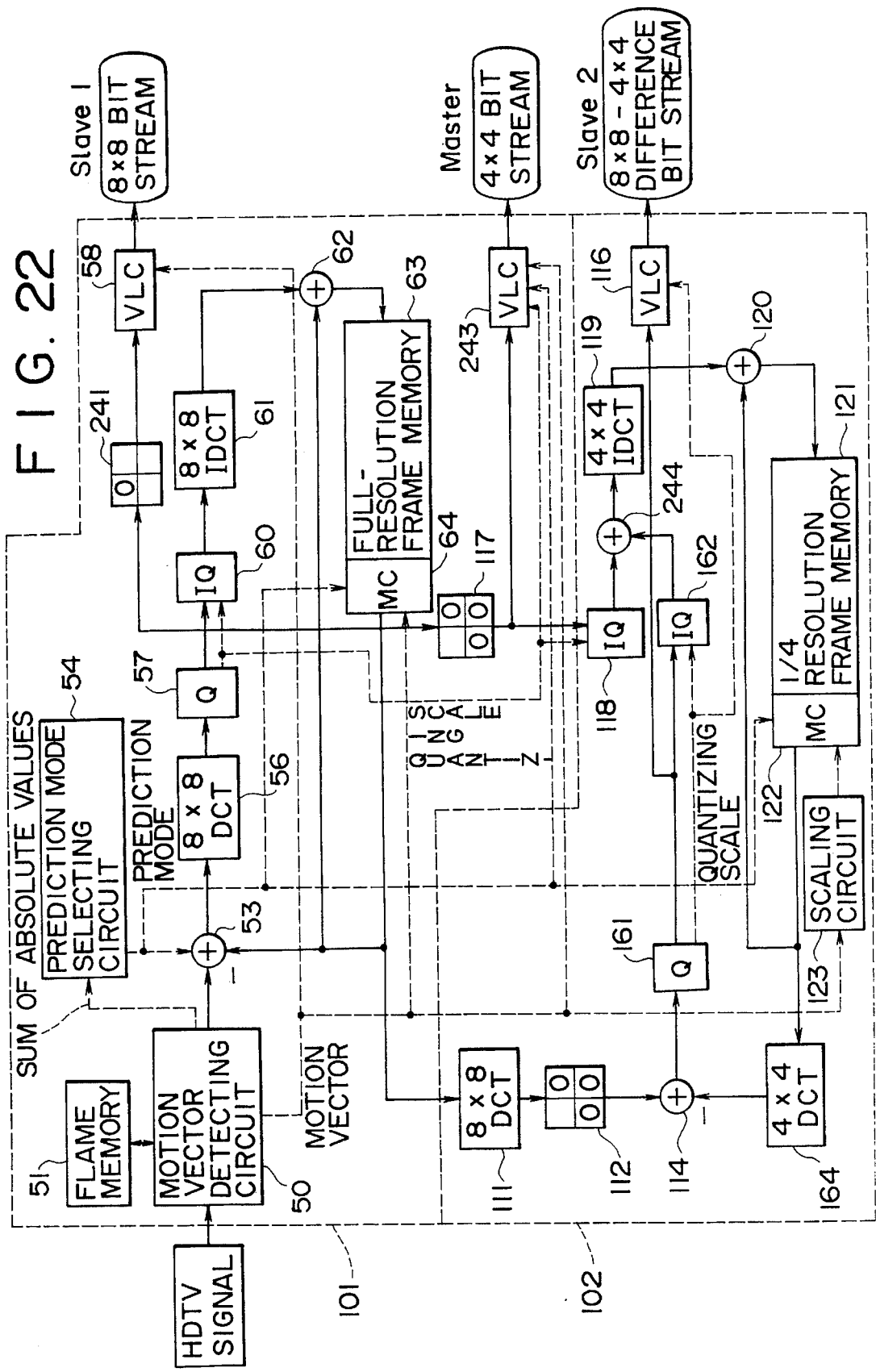
FIG. 22 is a block diagram of a fourth embodiment of an image signal encoder in accordance with the present invention.

FIG. 22 shows a fourth embodiment of an encoder according to the present invention. In this embodiment, the output of a quantizing circuit 57 included in a full-resolution encoding block 101 is supplied through a selecting circuit 241 to a variable-length coding circuit 58. The selecting circuit 241 extracts 4×4 data blocks including the DC component and lower frequency AC components included in the upper left-hand portion of each 8×8 DCT coefficient block and provides the same (8×4–4×4) to the variable-length coding circuit 58. The variable-length coding circuit 58 encodes the input data to provide an 8×8 bit stream.

A selecting circuit 117 selects the 4×4 data blocks in the upper left-hand portion of each 8×8 DCT block provided by the quantizing circuit, i.e., the data which are extracted by the selecting circuit 241, and provides the same to a variable-length coding circuit 243. The variable-length coding circuit 243 encodes the 4×4 data blocks from the circuit 117 to provide a 4×4 bit stream.

In this embodiment, the 8×8 block DCT difference data provided by the quantizing circuit 57 are used to produce a 4×4 block bit stream corresponding to the 4×4 DC and low frequency AC components in the upper left-hand portion of each 8×8 DCT block, as well as an 8×8 block bit stream excluding the data comprising the 4×4 block bit stream. A motion vector provided by a motion detecting circuit 50, a prediction mode provided by a prediction mode selecting circuit 54, and a quantizing scale provided by the quantizing circuit 57 are encoded by the variable-length coding circuit 243, and the coded data is transmitted in a 4×4 block bit stream. Naturally, the same data may be encoded by the variable-length coding circuit 58 and the coded data may be transmitted in an 8×8 bit stream. However, since the 8×8 bit stream representing the data is not used by the decoder, it is preferable to transmit the additional data in the 4×4 bit stream.

A quarter-resolution mismatching error correcting encoding unit 102 is the same in fundamental configuration as that of the encoder shown in FIG. 18, except that the quarter-resolution mismatching error correcting encoding unit 102 in this embodiment is not provided with the IDCT circuit 163, but instead includes the IDCT circuit 119 that serves also to carry out inverse transformation of mismatching error data provided by an inverse quantizing circuit 162. The output of the selecting circuit 117 is supplied to an inverse quantizing circuit 118. An adding circuit 244 adds difference data provided by the inverse quantizing circuit 118 and mismatching error data provided by the inverse quantizing circuit 162, the IDCT circuit 119 inverse transforms the output of the circuit 244, and the output of the IDCT circuit 119 is provided to an adding circuit 120. The circuit 120, similarly to the circuit 120 of the encoder shown in FIG. 18, provides corrected, locally decoded image data. The rest of the configuration and functions are the same as those of the encoder shown in FIG. 18.

Figure 23:
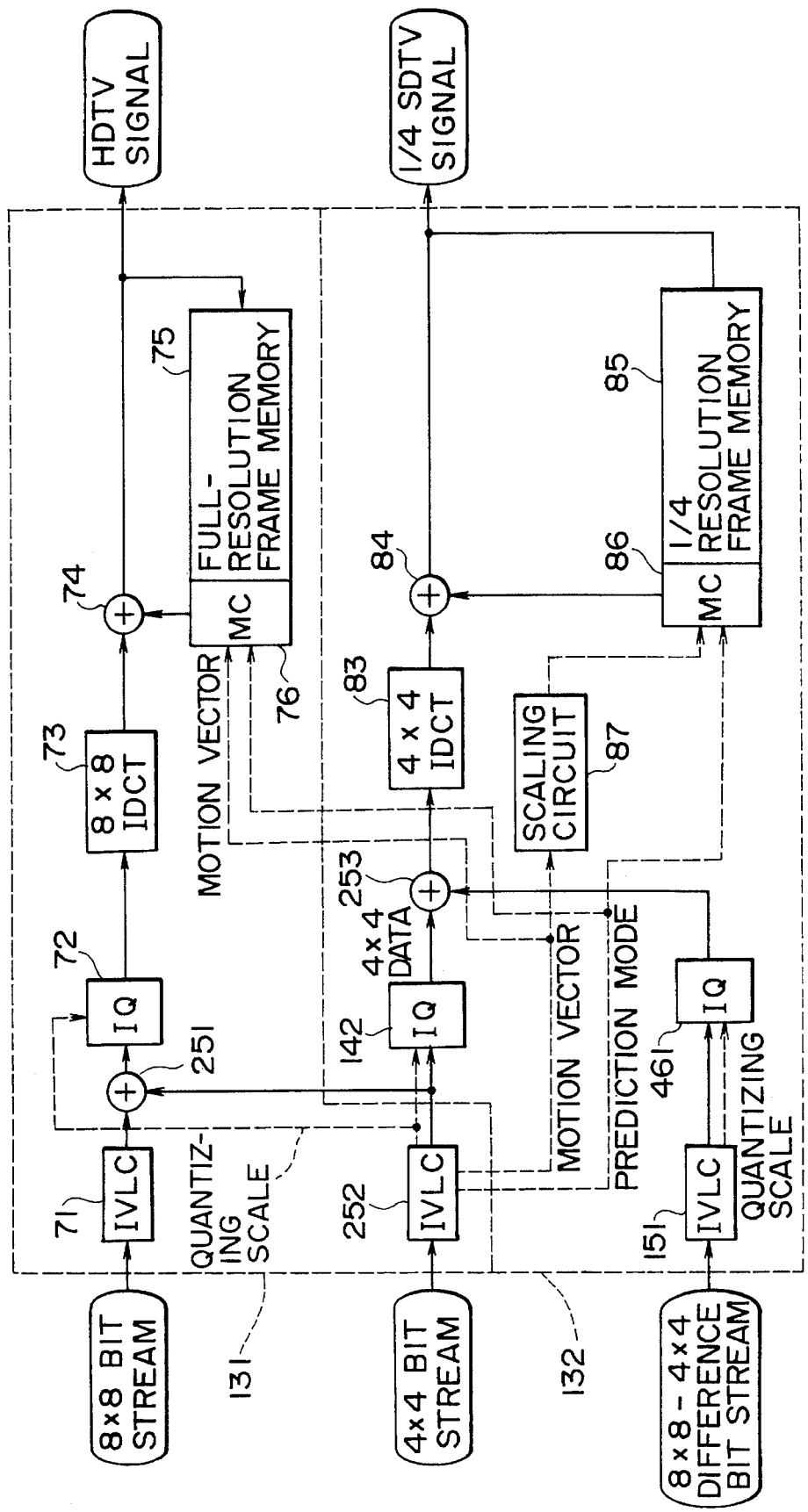
FIG. 23 is a block diagram of a fourth embodiment of an image signal decoder in accordance with the present invention.

FIG. 23 shows a fourth embodiment of a decoder according to the present invention for decoding the data provided by the encoder shown in FIG. 22. In this embodiment, an 8×8 bit stream is decoded by a variable-length decoding circuit 71 and the output of the variable-length decoding circuit 71 is supplied to an adding circuit 251. As noted above in connection with the encoder of FIG. 22, the 8×8 bit stream excludes a 4×4 data array including the DC and low frequency AC components of each 8×8 DCT data block. Therefore, data representing the excluded 4×4 data arrays obtained by decoding the 4×4 bit stream by means of a variable-length decoding circuit 252 is supplied to the summing circuit 251. The circuit 251 adds the respective outputs of the variable-length decoding circuits 71 and 252. Thus, the output of the circuit 251 represents the original 8×8 pixel data blocks (difference data). An inverse quantizing circuit 72, an IDCT circuit 73, an arithmetic unit 74, a full-resolution frame memory 75 and a motion compensating circuit 76 function as described above for decoding the output of the circuit 251 to provide HDTV signals.

The motion compensating circuit 76 receives motion vectors and prediction mode signals decoded by the variable-length decoding circuit 252.

Figure 9A:
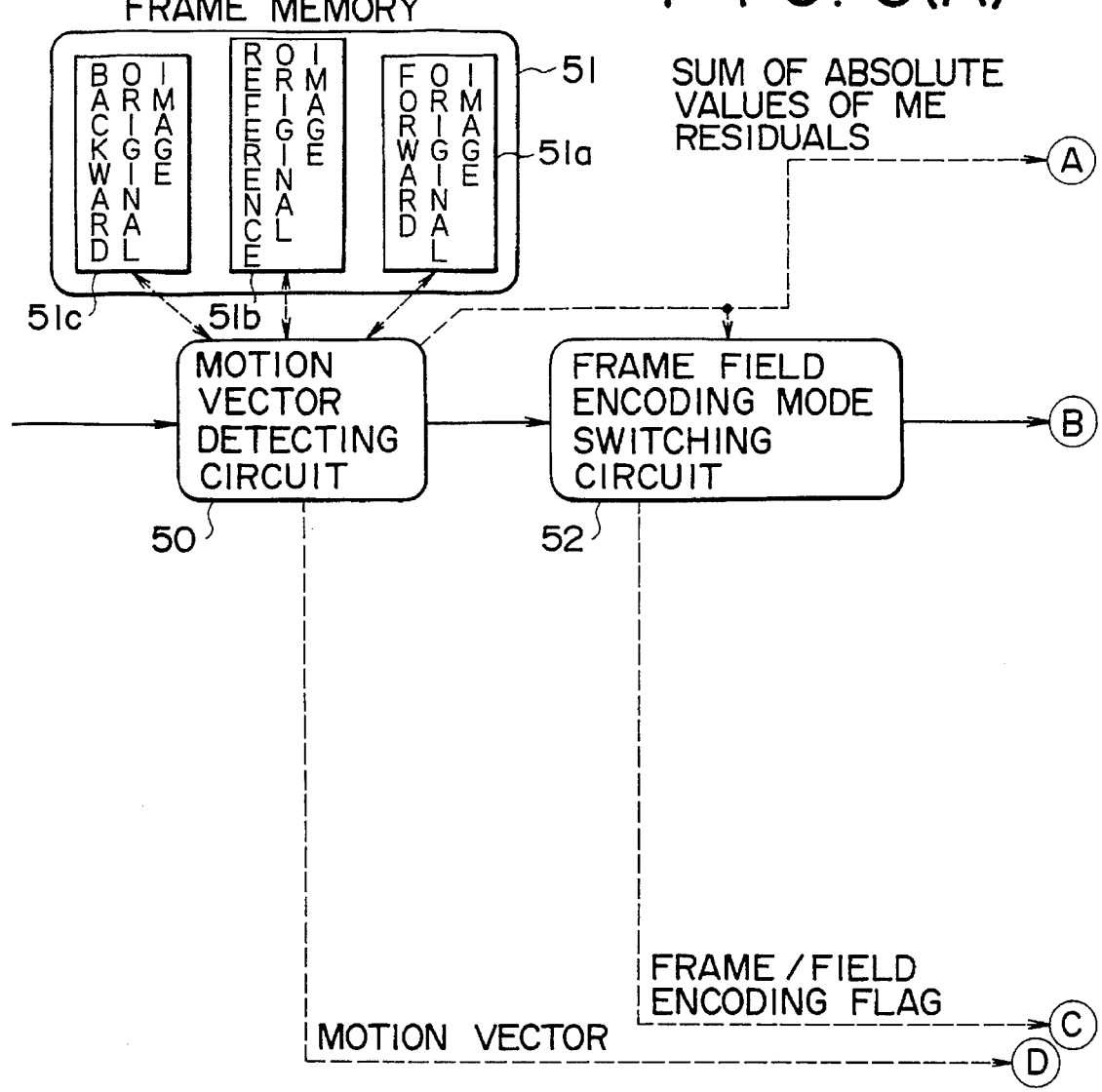
FIG. 9 consists of FIGS. 9A–9C and is a block diagram of an encoder included in the system of FIG. 1.
Figure 9:
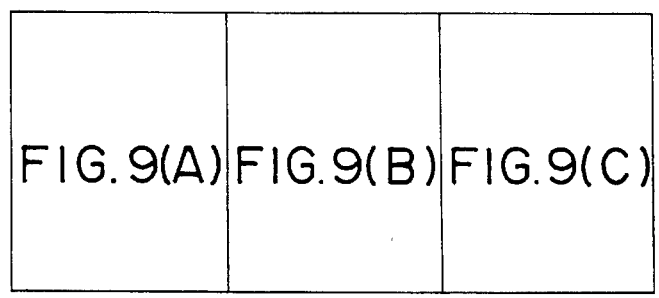
Figure 9B:
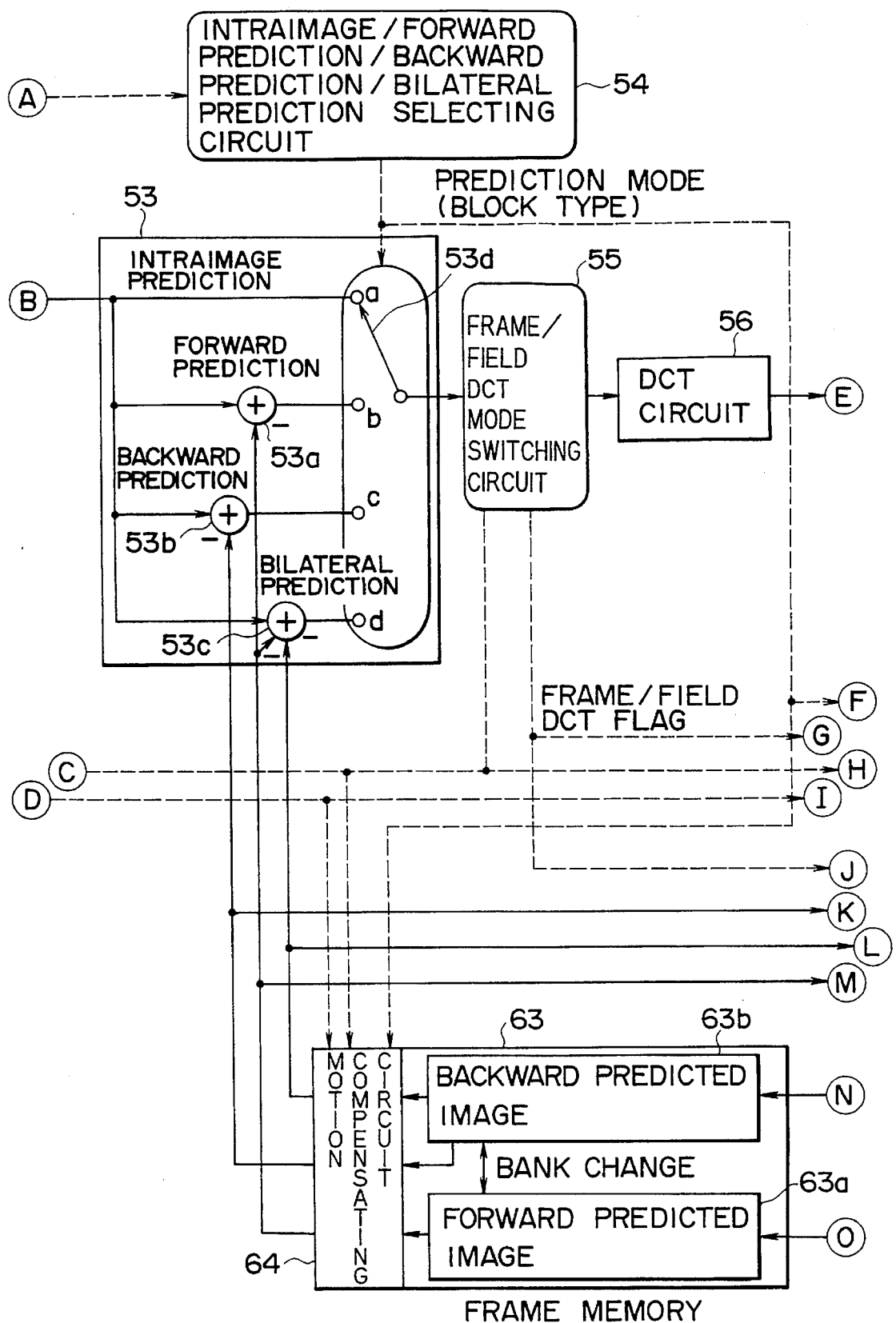
Figure 9C:
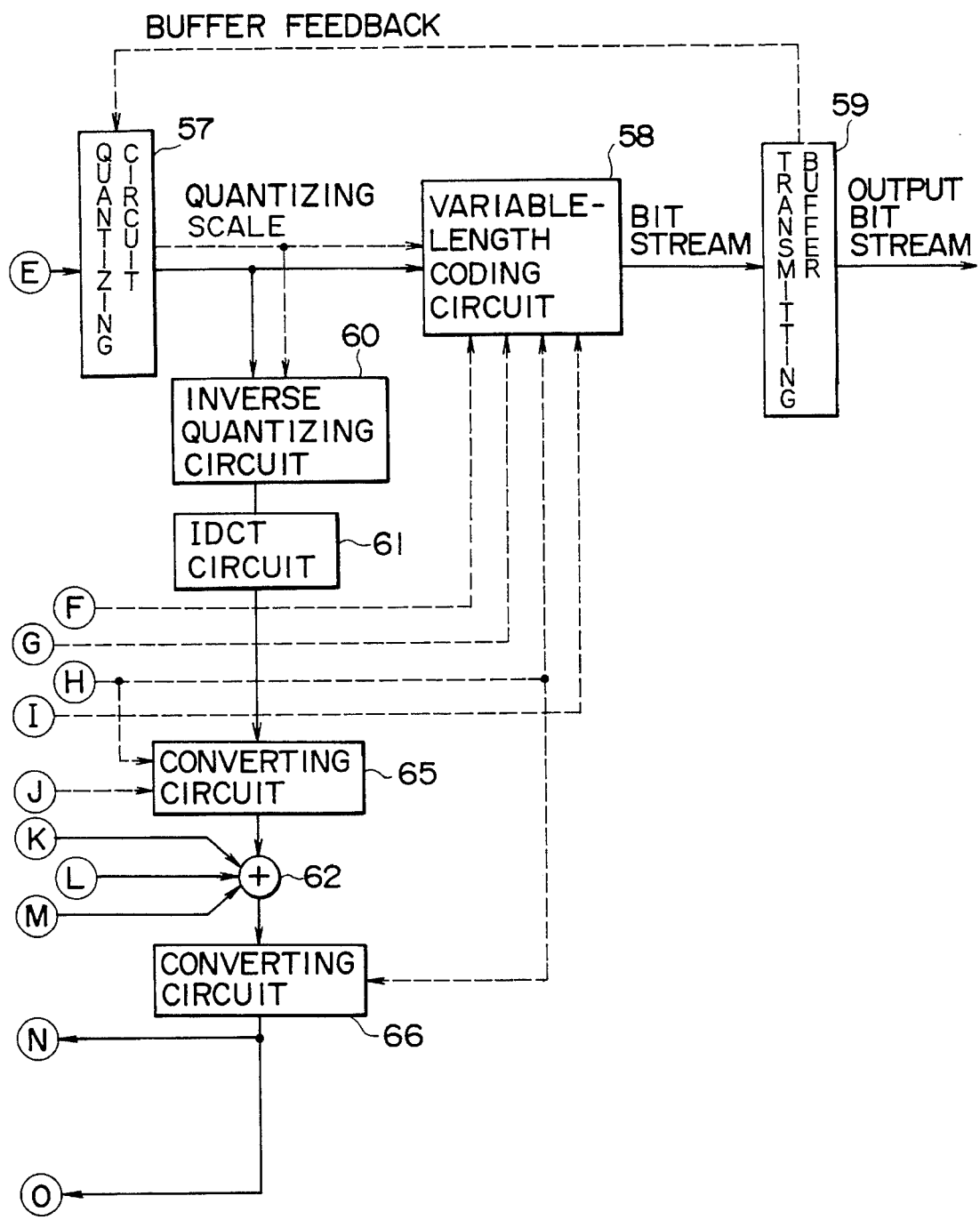

In a quarter-resolution mismatching error correcting decoding unit 132, an inverse quantizing circuit 142 processes the 4×4 pixel data provided by the variable-length decoding circuit 252 to obtain representative data, and the representative data are provided to a summing circuit 253. The difference bit stream produced by the encoder of FIG. 9 is decoded by a variable-length decoding circuit 151, and then an inverse quantizing circuit 461 processes the output of the variable-length decoding circuit 151 and supplies inverse quantized data to the circuit 253. The circuit 253 adds the difference data provided by the inverse quantizing circuit 142 and mismatching error data provided by the inverse quantizing circuit 461 to correct mismatching errors in order to provide corrected difference data.

An IDCT circuit 83 inverse transforms the output of the arithmetic unit 253 and supplies the transformed data to a summing circuit 84. A scaling circuit 87 scales down motion vectors provided by the variable-length decoding circuit 252 by a factor of two both with respect to the vertical direction and the horizontal direction and provides the scaled-down motion vectors to a motion compensating circuit 86. The motion compensating circuit 86 carries out motion compensation of data stored in a quarter-resolution frame memory 85 according to the motion vectors provided by the scaling circuit 87 and supplies predicted image data to the circuit 84. The circuit 84 adds the difference data provided by the IDCT circuit 83 and the predicted image data provided by the motion compensating circuit 86 to provide decoded quarter-resolution SDTV signals.

An encoder embodying the present invention provided, similarly to encoder shown in FIG. 9, with a prediction mode switching circuit 52, a DCT mode switching circuit 55 and converting circuits 65 and 66, and a decoder provided, similarly to the decoder shown in FIG. 13, with converting circuits 77, 78 and 88 will be described hereinafter.

Figure 24:
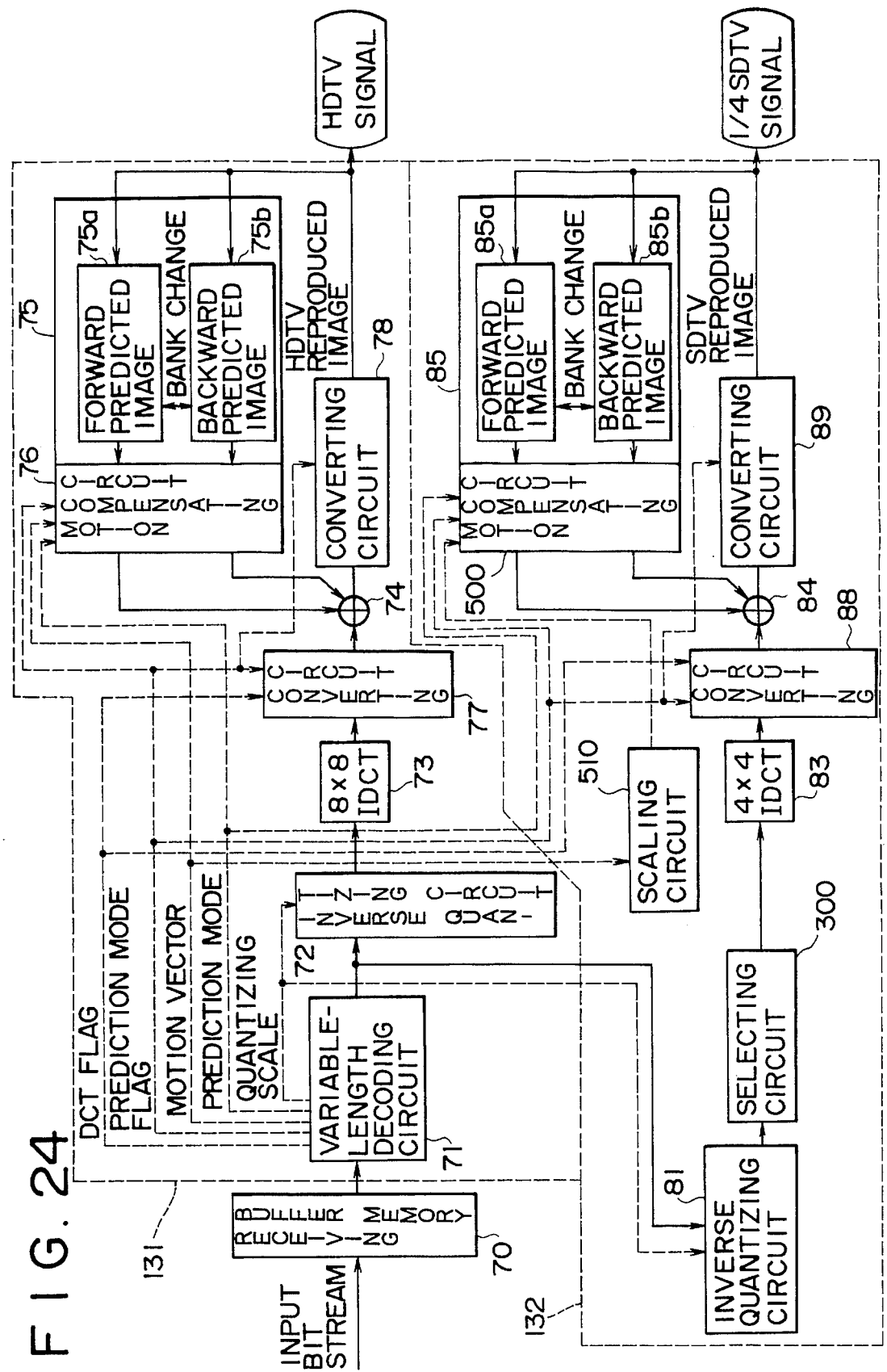
FIG. 24 is a block diagram of a fifth embodiment of an image signal encoder in accordance with the present invention.

FIG. 24 shows a fifth embodiment of a decoder according to the present invention provided, similarly to the decoder shown in FIG. 13, with converting circuits 77, 78 and 88. An encoder to be used in combination with this decoder is the same as the encoder shown in FIG. 14 (FIG. 9).

Referring to FIG. 24, an HD bit stream representing 8×8 pixel data blocks and transmitted by the encoder is applied to a receiving buffer memory 70. The HD bit stream includes a motion vector, a frame/field encoding mode flag, a frame/field DCT flag, a macroblock encoding mode and a quantizing scale. The decoder shown in FIG. 24 is basically the same in configuration and function as the decoder shown in FIG. 13, except that motion compensating circuits 76 and 86 included in the decoder shown in FIG. 24 are different in function from those of the decoder shown in FIG. 13. In this embodiment, motion compensation is performed according to the frame/field encoding mode. The relation between the frame/field encoding mode and motion compensation in this embodiment will be described hereinafter.

In the embodiment shown in FIG. 24, the positions of an inverse quantizing circuit 81 and a selecting circuit 82 may be interchanged.

The motion compensating operation of the decoder shown in FIG. 13 will be described with reference to FIG. 25 to clarify the motion compensating operation of the decoder in this embodiment.

Figure 25:
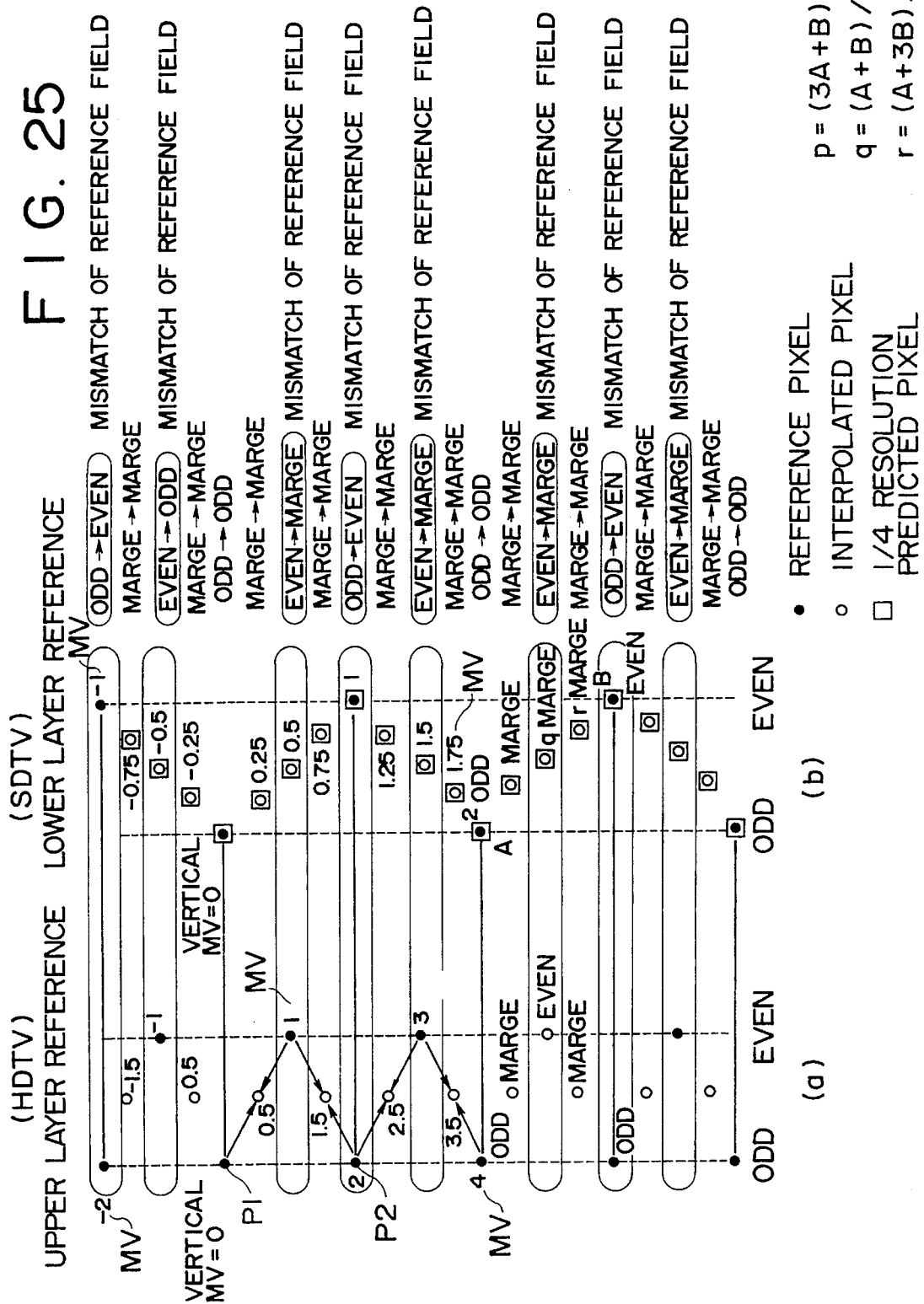
FIG. 25 is a diagram for use in explaining motion compensation in the encoder of FIG. 24.

In FIG. 25, (a) shows a procedure for the motion compensation of high-resolution image data stored in the frame memory 63 of the encoder shown in FIG. 9 (and the frame memory 75 of the decoder shown in FIG. 24) and (b) shows a procedure for the motion compensation of pixel data stored in a frame memory 85 included in the decoder shown in FIG. 24. More specifically, the dotted vertical lines labelled hood and "even" in (a) designate vertically aligned pixel positions in respective odd and even fields of the HDTV pixel data, which the dotted vertical lines labelled "odd" and "even" in (b) designate vertically aligned pixel positions in respective odd and even fields of the SDTV pixel data.

Suppose, for simplicity, that a motion vector 1 indicates only vertical motion and, more specifically, a vertical offset corresponding to one pixel on interleaved high-resolution screens. As shown in (a) of FIG. 25, in the encoder of FIG. 9 a pixel motion-compensated by a motion vector "1" relative to a reference pixel having a motion vector (MV) "0" is shifted down by one line to the next lower line, a pixel P2 motion-compensated by a motion vector "2" is shifted down by two lines to the second lower line. When the motion vector is "1.5", the mean of the pixel on the next lower line and the pixel on the second lower line is calculated to determine the motion-compensated pixel (interpolated pixel) motion-compensated by using the motion vector "1.5".

Since in a quarter resolution decoder quarter-resolution data is obtained by thinning out the pixels of high-resolution data by a factor of 2 both with respect to the vertical direction and the horizontal direction, pixels on every other line in high-resolution odd fields are divided into those of quarter-resolution odd fields and those of quarter-resolution even fields and the separated pixels are stored separately in a frame memory 85. Since motion vectors supplied to a motion compensating circuit 86 are scaled down by a factor of two both with respect to the vertical direction and the horizontal direction by a scaling circuit 87, the data motion-compensated by using the scaled-down motion vector is on the next lower line (the second lower line on the high-resolution screen) as shown in (b) FIG. 25.

When producing pixels p, q and r between pixels A and B, the pixels p, q and r are calculated by using the following expressions.

$p=(3A+B)/4$ $q=(A+B)/2$ $r=(A+3B)/4$

[0 15 8]
Since pixels as determined by the motion vectors which do not correspond to the address of a stored pixel are determined by interpolation, a pixel motion-compensated according to a high-resolution motion vector "3", for example, is a pixel motion-compensated according to a quarter-resolution motion vector "1.5". As shown in (b) of FIG. 25, the pixel produced by motion compensation using the motion vector "1.5" is intermediate field data calculated on the basis of pixels in an odd field and an even field. Accordingly, a field difference appears between the data of the HDTV signals provided by the encoder and the data of SDTV signals provided by the decoder and, consequently, the mismatch errors occur.

Figure 26:
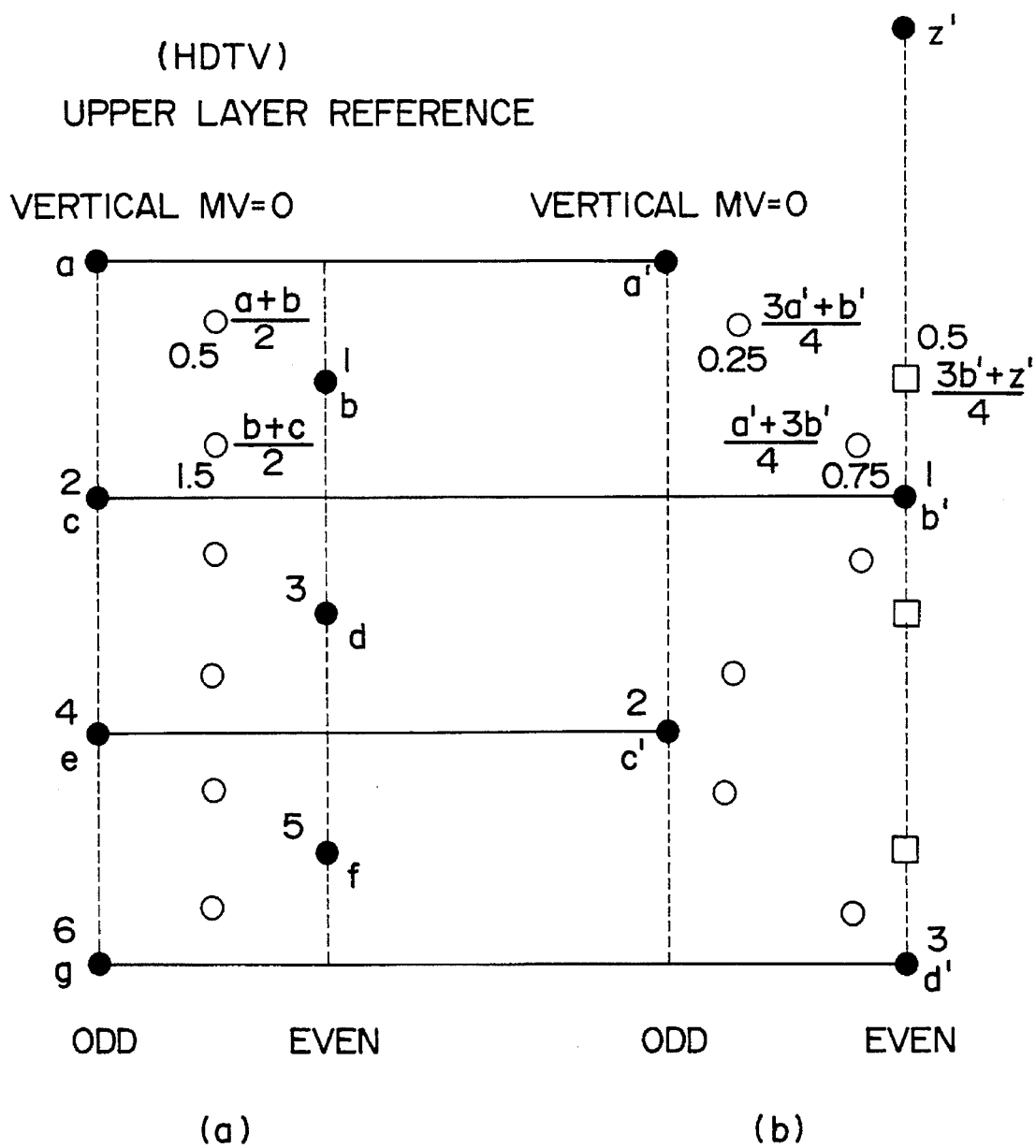
FIG. 26 is a diagram for use in explaining motion compensation carried out by the image signal encoder of FIG. 24 in a frame encoding mode.

FIG. 26 shows a motion compensation process in accordance with an embodiment of the present invention to be carried out when the variable-length decoding circuit 71 provides a frame prediction mode flag, i.e., when the circuit 52 sets the encoding mode. The motion compensating operations of the frame memory 75 and the motion compensating circuit 76 (of the encoder) for motion-compensating the high-resolution image data shown in (a) of FIG. 26 are the same as those shown in (a) of FIG. 25. The motion compensating operations of the frame memory 85 and the motion compensating circuit 86 of the decoder for the low-resolution image data shown in (b) of FIG. 26 are different from those shown in (b) of FIG. 25.

In this embodiment, a low-resolution pixel corresponding to a high-resolution pixel b is calculated by using an expression: $(3b'+z')/4$, where b' is a pixel in an even field and z' is a pixel in an even field, instead of determining the same by interpolation on the basis of a pixel a' in an odd field and the pixel b' in an even field. Therefore, the data obtained by interpolation is data for even fields. Thus, the field of the high-resolution pixel b and the field of the low-resolution pixel $(3b'+z')$ fall within a corresponding field, which suppresses degradation of the interlaced structure and of the natural motion of the image.

Figure 27:
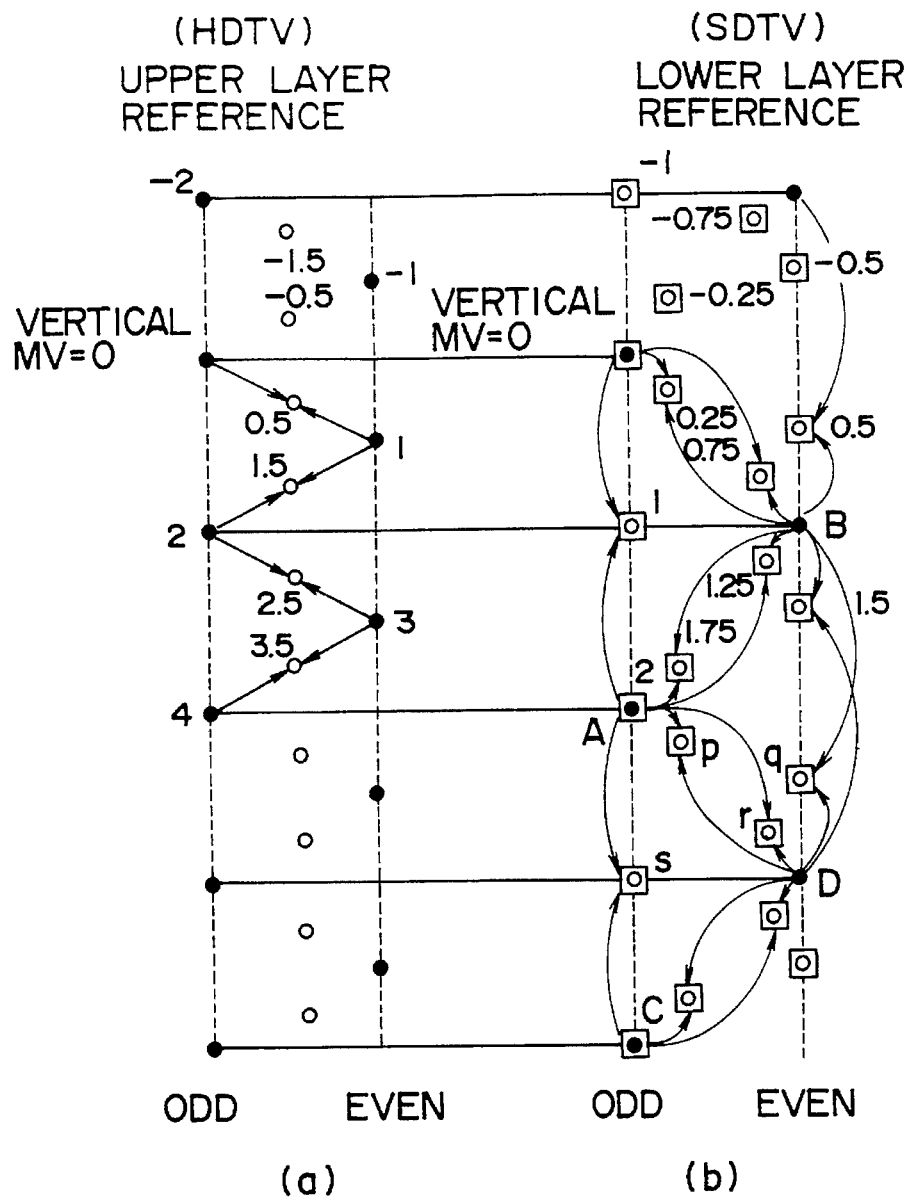
FIG. 27 is a diagram for use in explaining motion compensation carried out by the image signal encoder of FIG. 24 in a frame encoding mode.

FIG. 27 shows another motion compensating operation embodying the present invention in the frame prediction mode. In this embodiment, pixel data is estimated by interpolation using a pixel corresponding to a motion vector "0" for an odd field and a pixel corresponding to a motion vector "2", instead of estimating a pixel B in an even field through the motion compensation of pixel data having a motion vector "0" using a motion vector "1". Thus, the field of the data coincides with that of the corresponding high-resolution pixel (a pixel corresponding to the motion vector "2") (odd fields).

In other words, the embodiment shown in FIG. 26 gives priority to the low-resolution reference pixel b' and refers to the pixel b' as a motion-compensated pixel when the low-resolution reference pixel b' corresponding to the high-resolution pixel c exists. On the other hand, the embodiment shown in FIG. 27 forms an interpolated pixel so that the fields coincide with each other even if a low-resolution pixel B exists, when the field of the low-resolution pixel B is different from that of the corresponding high-resolution pixel (pixel having a motion vector "2"), because the high-resolution pixel is in an odd field while the low-resolution pixel is in an even field.

Figure 28:
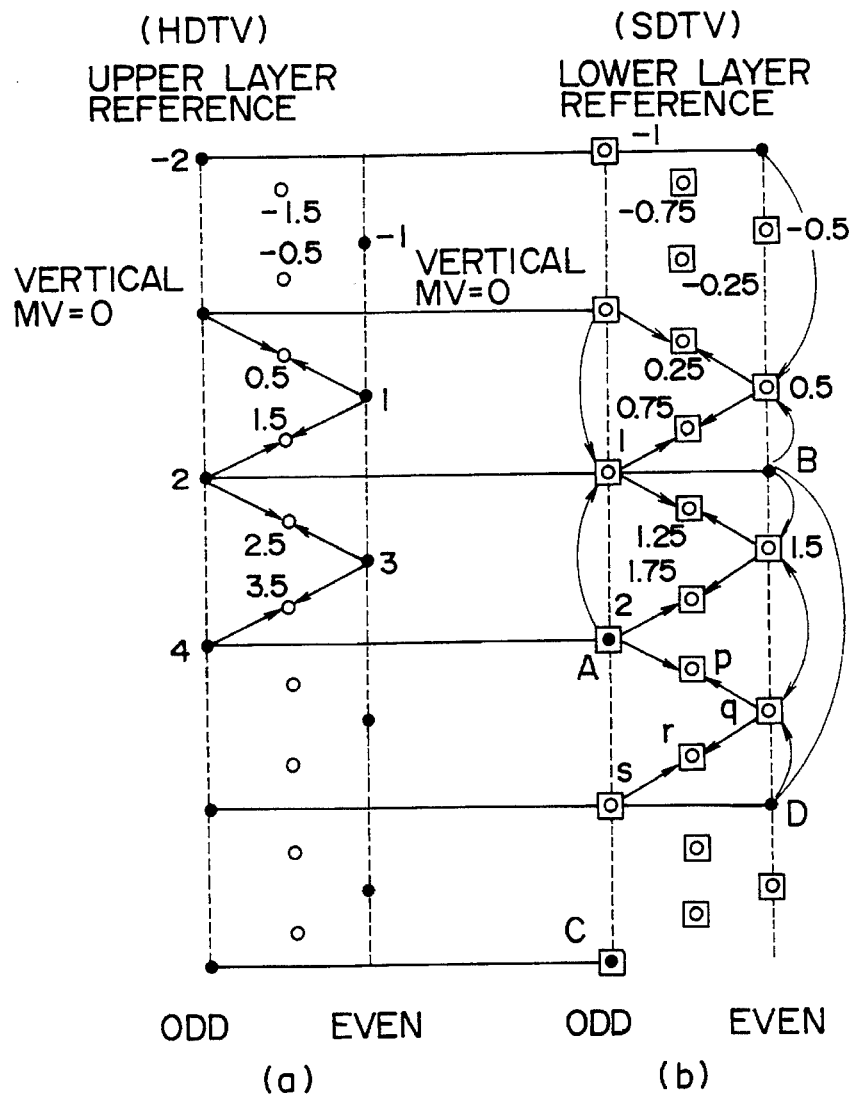
FIG. 28 is a diagram for use in explaining a further motion compensation technique carried out by the image signal encoder of FIG. 24.

FIG. 28 shows a further motion compensating operation embodying the present invention in the frame prediction mode. In this embodiment, pixel data corresponding to high-resolution pixels is determined by interpolation in both an odd field and an even field so that the fields will coincide with each other. For example, a pixel in an even field corresponding to a motion vector "1.5" is determined by weighted interpolation using pixels B and D in an even field. Thus, the field and position of a high-resolution pixel corresponding to a motion vector "3" correspond to those of the low-resolution pixel. A pixel corresponding to a motion vector "1.25" is determined by interpolation using pixels respectively corresponding to motion vectors "1" and "1.5", so that the field and position of the high-resolution pixel data and those of the low-resolution pixel data coincide perfectly with each other.

Figure 29:
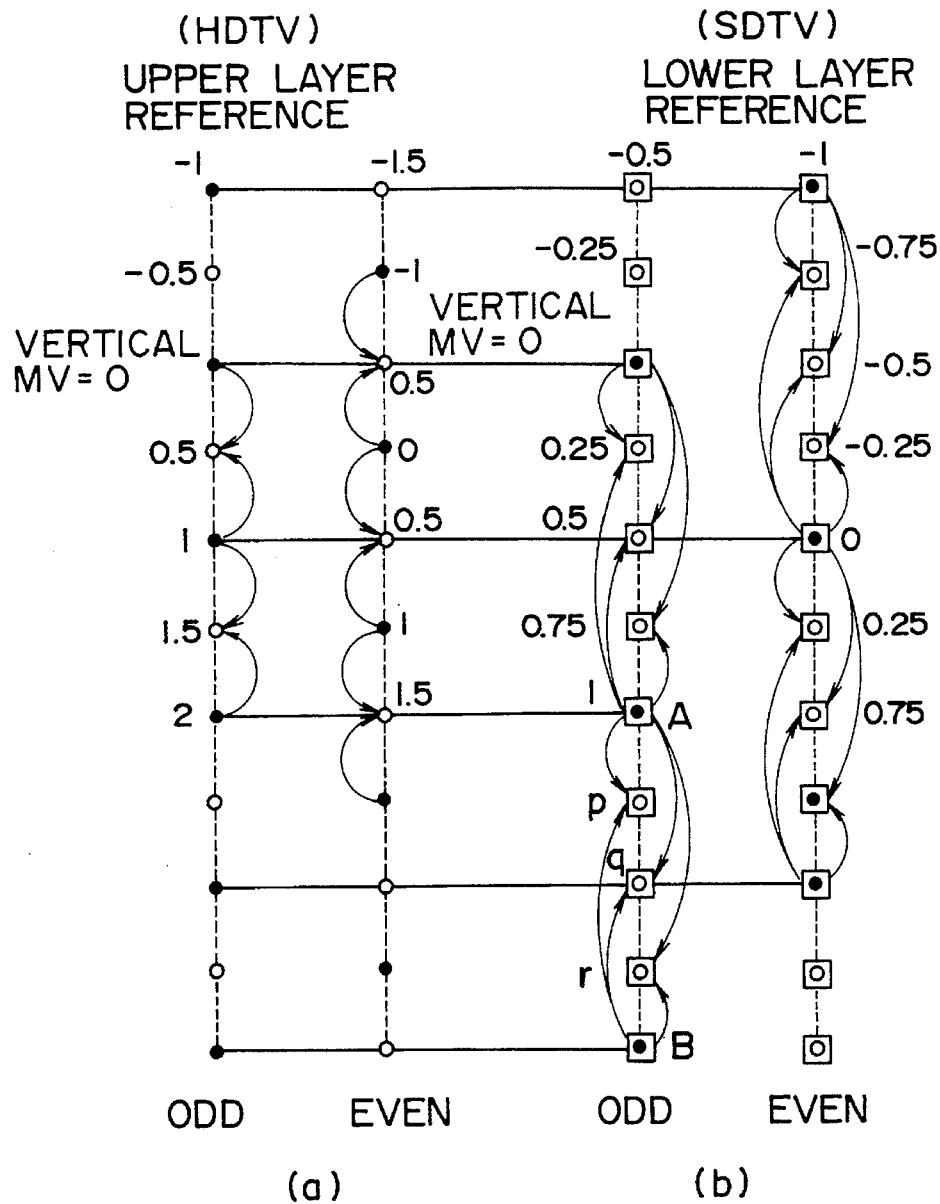
FIG. 29 is a further diagram for use in explaining another motion compensation technique carried out by the image signal encoder of FIG. 24 in a field encoding mode.

FIG. 29 shows a motion compensating operation embodying the present invention in the field encoding mode. As shown in FIG. 29, pixel data in an odd field is determined by interpolation using another pixel data in the odd field, and pixel data in an even field is determined by interpolation using another pixel data in the even field.

When the frame encoding mode and the field encoding mode are suitably selected by the encoder, the decoder carries out the foregoing motion compensating operation to provide quarter-resolution interlace images that move smoothly.

The data provided by the foregoing encoders in certain applications is recorded on a recording medium. A method of fabricating the recording medium will be described hereinafter with reference to FIGS. 30 and 31.

Figure 30:
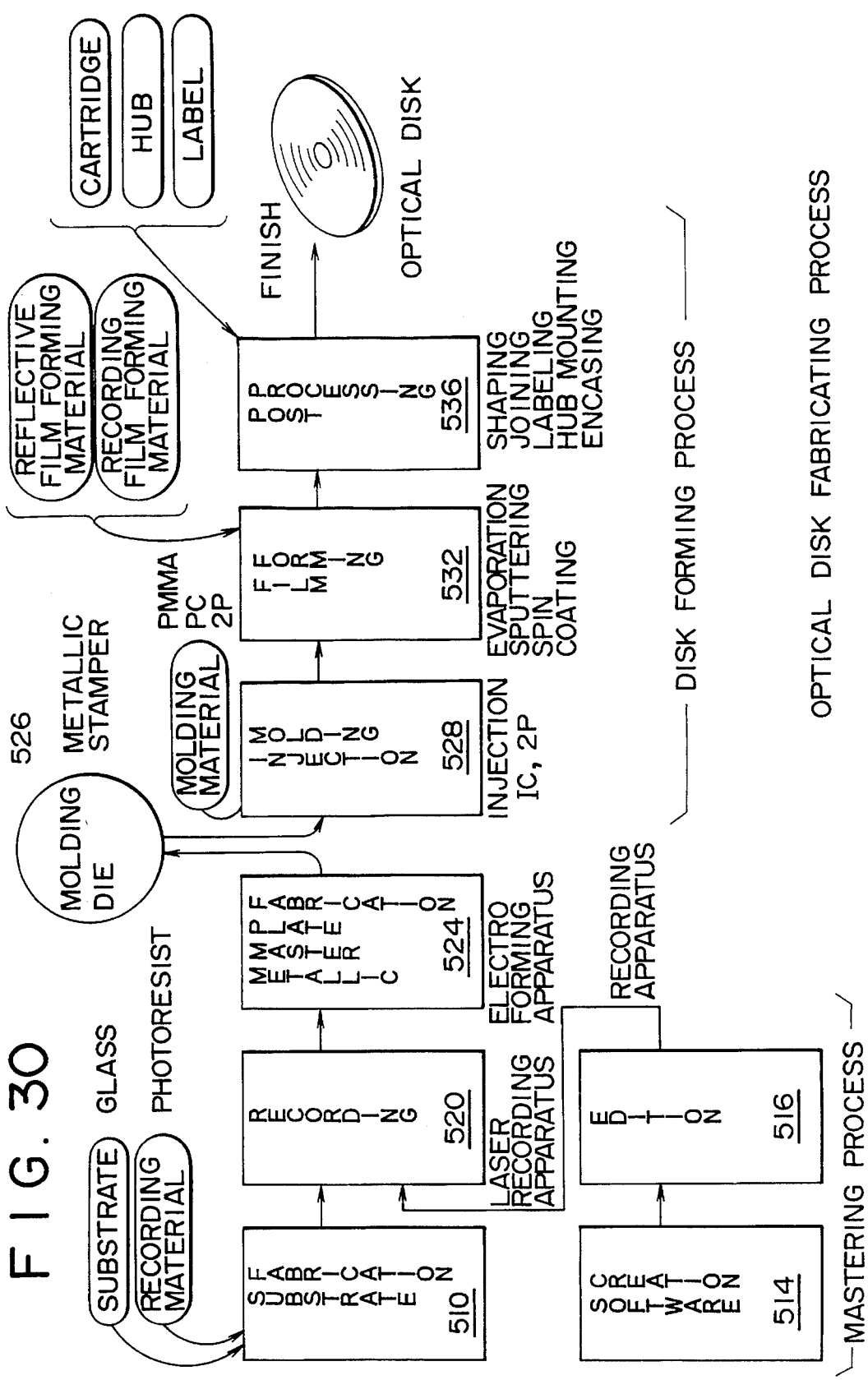
FIG. 30 is a diagram for use in explaining a process for producing a device-readable record in accordance with an embodiment of the present invention.

As shown in FIG. 30, in a step 510 a film of a recording material, such as a photoresist, is formed over the surface of a substrate, such as a glass substrate, to form a recording substrate.

Then, as shown in FIG. 31, video data produced through predictive coding by a video encoder 501 is stored temporarily in a buffer 503 and audio data produced through coding by an audio encoder 502 is stored temporarily in a buffer 504. The video data and the audio data stored respectively in the buffers 503 and 504 are multiplexed together with a synchronizing signal by a multiplexer (MPX) 505 to produce a composite signal. An error correcting coding circuit (ECC) 506 adds error correcting codes to the composite signal. A modulating circuit (MOD) 507 subjects the composite signal to predetermined modulation, and then the modulated composite signal is recorded temporarily, for example, on a magnetic tape to produce recording software, as also indicated in step 514 in FIG. 28. When necessary, the software is edited by using a premastering device 508 of FIG. 31 (corresponding to step 516 in FIG. 30) to produce a recording signal in a format suitable for recording the recording signal on an optical disk.

Then, as shown in FIG. 30, in a step 520 a laser beam is modulated according to the recording signal and photoresist film is irradiated with the modulated laser beam to expose the photoresist film in a pattern corresponding to the recording signal.

The exposed recording substrate is subjected to a developing process to form pits in the recording substrate. Then, the recording substrate is subjected to an electroforming process or the like (step 524) in which the pits are duplicated in the recording substrate to obtain a metallic master plate. The metallic master plate is used for forming a metallic stamper for use as a molding die (step 526).

In step 528, a resin, such as PMMA (polymethyl methacrylate resin) or PC (polycarbonate resin), is injected into the molding die by, for example, an injection molding method and the injected resin is hardened or a 2P (ultraviolet-hardening photopolymer) is applied to the surface of the metallic stamper in a film and the film is irradiated with ultraviolet radiation to harden the film. Thus the metallic stamper is duplicated in a resin replica having the pits corresponding to those formed in the metallic stamper.

In step 532 reflecting film is formed over the surface of the resin replica by an evaporation process, a sputtering process or a spin-coating process.

Then, in step 536 the replica is subjected to necessary processes including trimming the replica to predetermined inside and outside diameters and joining two replicas (back-to-back) together to form a disk. A label is attached to the disk, a hub is attached to the disk and the disk is mounted in a cartridge to complete an optical disk.

Although the present invention has been described as applied to encoders employing DCT, the present invention is applicable also to encoders which processes two-dimensional input image data by other predetermined transformation process to encode the input two-dimensional image data, such as encoders which employ QMF for subband coding and encoders which employ wavelet transformation for octave separation, all of which are referred to herein as "transformation".

The present invention is applicable to decoders which decode transformed and coded data as well as to decoders which decode data obtained by DCT. In such decoders, for example, the quarter-resolution decoder may process one-fourth of the data in the low-frequency region or similar data among all the encoded coefficient data for inverse transformation or reconstruction.

Although the present invention has been described as applied to encoding and decoding quarter-resolution image data and sixteenth-resolution image date, the present invention is applicable also to encoding and decoding image data having a resolution lower than the normal resolution, other than quarter resolution and sixteenth resolution data.

What is claimed is:

1. A method of encoding an input image signal through transformation and predictive encoding, comprising the steps of:

producing first image difference data of first resolution through transformation and predictive encoding of the input image signal based on first predicted image data of said first resolution;

producing second predicted image data of second resolution relatively lower than said first resolution from the first image difference data;

producing third predicted image data of said second resolution from the first predicted image data;

producing mismatch error data based on differences between the second and third predicted image data; and encoding the mismatch error data.

2. The method of claim 1, in combination with the step of recording the first image difference data and the mismatch error data on a record medium.

3. A system for encoding an input image signal through transformation and predictive encoding, comprising:

means for producing first image difference data of first resolution through transformation and predictive encoding of the input image signal based on first predicted image data of said first resolution;

means for producing second predicted image data of second resolution relatively lower than said first resolution from the first image difference data;

means for producing third predicted image data of said second resolution based on the first predicted image data;

means for producing mismatch error data based on differences between the second and third predicted image data; and means for encoding the mismatch error data.

4. The system of claim 3, in combination with means for recording the first image difference data and the mismatch error data on a record medium.

5. The method of claim 2, further including the steps of encoding the first image difference data, and wherein the step of recording the first image difference data and the mismatch error data comprises recording the encoded first image difference data and the encoded mismatch error data on the record medium.

6. The method of claim 1, further comprising the steps of producing second image difference data of said second resolution based on the first image difference data and encoding the second image difference data.

7. The method of claim 6, in combination with the step of recording the encoded second image difference data and the encoded mismatch error data on a record medium.

8. The method of claim 1, wherein the step of producing the third predicted image data comprises transforming the first predicted image data to produce a plurality of frequency components thereof including first and second sets of frequency components, the first set of frequency components representing frequencies lower than frequencies represented by the second set of frequency components, and selecting the first set of frequency components to produce the third predicted image data.

9. The method of claim 8, wherein the step of producing the second predicted image data comprises forming fourth predicted image data based on the first image difference data and transforming the fourth predicted image data to form the second predicted image data in the form of a plurality of frequency components of the fourth predicted image data.

10. The method of claim 1, wherein the step of producing the first image difference data comprises forming said first image difference data as a plurality of frequency components including first and second sets of frequency components, the first set of frequency components representing frequencies lower than frequencies represented by the second set of frequency components, and the step of producing the second predicted image data comprises producing the second predicted image data based on the first set of frequency components.

11. The method of claim 10, wherein the step of producing the second predicted image data comprises inverse transforming the first set of frequency components to produce transformed data of said second resolution, adding the transformed data of said second resolution to the mismatch error data to produce second resolution image data and producing the second predicted image data based on the second resolution image data.

12. The method of claim 10, wherein the step of producing the mismatch error data comprises producing the mismatch error data as a plurality of frequency components, and the step of producing the second predicted image data comprises adding the mismatch error data to the first set of frequency components of the first image difference data to produce second resolution frequency component data, inverse transforming the second resolution frequency component data to produce second resolution image data, producing fourth predicted image data based on the second resolution image data, and transforming the fourth predicted image data to produce the second predicted image data as a plurality of frequency components.

13. The system of claim 4, further comprising means for encoding the first image difference data, and wherein the recording means is operative to record the encoded first image difference data and the encoded mismatch error data on the record medium.

14. The apparatus of claim 3, further comprising means for producing second image difference data of said second resolution based on the first image difference data and means for encoding the second image difference data.

15. The system of claim 14, in combination with means for recording the encoded second image difference data and the encoded mismatch error data on a record medium.

16. The system of claim 3, wherein the means for producing the third predicted image data comprises means for transforming the first predicted image data to produce a plurality of frequency components thereof including first and second sets of frequency components, the first set of frequency components representing frequencies lower than frequencies represented by the second set of frequency components, and means for selected the first set of frequency components to produce the third predicted image data.

17. The system of claim 16, wherein the means for producing the second predicted image data comprises means for forming fourth predicted image data based on the first image difference data and means for transforming the fourth predicted image data to form the second predicted image data in the form of a plurality of frequency components of the fourth predicted image data.

18. The system of claim 3, wherein the means for producing the first image difference data comprises means for forming said first image difference data as a plurality of frequency components including first and second sets of frequency components, the first set of frequency components representing frequencies lower than frequencies represented by the second set of frequency components, and the means for producing the second predicted image data is operative to produce the second predicted image data based on the first set of frequency components.

19. The system of claim 18, wherein the means for producing the second predicted image data comprises means for inverse transforming the first set of frequency components to produce transformed data of said second resolution, means for adding the transformed data of said second resolution to the mismatch error data to produce second resolution image data and means for producing the second predicted image data based on the second resolution image data.

20. The system of claim 18, wherein the means for producing the mismatch error data is operative to produce the mismatch error data as a plurality of frequency components, and the means for producing the second predicted image data comprises means for adding the mismatch error data to the first set of frequency components of the first image difference data to produce second resolution frequency component data, means for inverse transforming the second resolution frequency component data to produce second resolution image data, means for producing fourth predicted image data based on the second resolution image data, and means for transforming the fourth predicted image data to produce the second predicted image data as a plurality of frequency components.

* * * * *